United States Patent [19]

Nakaya

[11] Patent Number: 5,791,388

[45] Date of Patent: Aug. 11, 1998

[54] METHOD FOR CONTROLLING THE FEED OF BACKUP ROLLS IN A VENEER LATHE AND A BACKUP ROLL APPARATUS IN A VENEER

[75] Inventor: Takashi Nakaya, Ohbu, Japan

[73] Assignee: Meinan Machinery Works, Inc., Ohbu, Japan

[21] Appl. No.: 843,902

[22] Filed: Apr. 17, 1997

[30] Foreign Application Priority Data

Apr. 22, 1996 [JP] Japan .................................. 8-100388
Apr. 11, 1997 [JP] Japan .................................. 9-093963

[51] Int. Cl.$^6$ .................................. B27B 1/00; B27C 1/00; B27L 5/02; G06F 15/46
[52] U.S. Cl. .................................. 144/357; 144/213; 144/365; 144/392; 144/408; 364/474.02; 364/474.09
[58] Field of Search .................................. 364/167.01, 474.04, 364/474.09; 82/1.11; 144/209.1, 213, 356, 357, 365, 211, 212, 213 A

[56] References Cited

U.S. PATENT DOCUMENTS

| | | | |
|---|---|---|---|
| 4,396,049 | 8/1983 | Calvert et al. | 144/212 |
| 4,893,663 | 1/1990 | Ely | 144/213 |
| 5,016,692 | 5/1991 | Cremona | 144/213 |
| 5,141,038 | 8/1992 | Nakaya | 144/213 |
| 5,452,220 | 9/1995 | Ely | 144/357 |
| 5,564,253 | 10/1996 | Nakaya | 144/356 |

*Primary Examiner*—W. Donald Bray
*Attorney, Agent, or Firm*—Pearson & Pearson

[57] ABSTRACT

A method of controlling the feed of the backup rolls of a log backup apparatus for use in a veneer lathe for preventing a log from bowing while veneer is peeled from the log. The method comprises the step of centripetally feeding the backup rolls from a control-start diameter $\Phi$ at a provisional feed rate f which is higher than a predetermined feed rate F by a feed rate of a pre-selected correction value $\alpha$ per log rotation. The aforementioned control-start diameter $\Phi$ is slightly larger than the diameter of the log at which the backup rolls are brought into contact with the log. The method further comprises the steps of stopping the centripetal feeding of the backup rolls at the provisional feed rate f when the bowing is eliminated from the log and thereafter centripetally feeding the backup rolls at the predetermined feed rate F, thereby eliminating the bowing that occurs during the veneer peeling from the log.

13 Claims, 15 Drawing Sheets

METHOD FOR CONTROLLING THE FEED OF BACKUP ROLLS IN A VENEER LATHE AND A BACKUP ROLL APPARATUS IN A VENEER

BACKGROUND OF THE INVENTION

1. Field of the Invention

The present invention relates to a method for peeling veneer from a log and an apparatus to which the method is applied. More particularly, the present invention relates to a method for controlling the feed of a backup roll which presses a log to prevent the bowing of the log in a spindle-drive or peripheral-drive veneer lathe and a backup roll to which the method is applied.

2. Description of the Prior Art

In a typical veneer lathe, veneer is peeled from a log by continuously feeding the tool post fitted with a veneer knife (referred to as "knife" hereinafter) in the centripetal direction of the log by the distance corresponding to the predetermined thickness of the veneer for each rotation of the log. As the diameter of the log decreases during peeling, the log begins to bow under load, such as cutting resistance. This condition occurs in a peripheral-drive lathe, in which the spindles for holding a log at the axial ends thereof are disengaged from the log at a convenient time during peeling as well as in a spindle-drive veneer lathe, in which the spindles hold a log at the axial ends throughout peeling.

FIG. 1 shows the core of a log peeled in a bowed condition. The log is tapered toward both ends with the diameter in the middle thicker than those at the ends. Such bowing, depending on the degree, causes various problems: breakage of the log when it is peeled to a small diameter; an uneven thickness of veneer due to vibration of the log; and an upward bowing of peeled veneer due to the veneer being thinner in the middle. All of these problems reduce the quality and yield of veneer, preventing proper peeling operation.

FIG. 15 shows one type of system known in the art to provide a solution to the aforementioned problems caused by the bowing of the log. The illustrated system for preventing a log from bowing has a single or a plurality of rotary rolls 21 (referred to as "backup roll" hereinafter) disposed in a position approximately diametrically opposite to the veneer knife of the lathe. The backup rolls 21 are fed in the centripetal direction while applying pressure to the log 1.

The cross section of a log may not be completely circular or the peripheral surface of a log may be bumpy with a branch stump, a knot, or a gnarl. Even if a log has such an uneven shape, it can still be peeled by applying pressure thereto with backup rolls in keeping with the feed rate of the tool post fitted with the veneer knife. However, if a log with a crack or having bark on its surface is pressured by backup rolls, an abnormal load may be applied to the log. Consequently, the log may break or the crack may spread, causing the peeled veneer to be stuck on the cutting edge of the knife. Therefore, it is a normal practice to peel a log down to an approximately cylindrical shape and then bring the backup rolls into contact with the log. (The preparatory peeling of a log to a cylindrical shape will be referred to as "pre-peeling" hereinafter.) In some cases, logs that have already been pre-peeled are set in a veneer lathe.

Backup roll systems can be classified into two basic types in terms of the feed control method. One is the forced-feed system and the other is the follow-up feed system. The forced-feed backup roll system includes a drive mechanism such as a hydraulic cylinder or pneumatic cylinder for pressing the backup rolls against the log. The bowing of the log continuously changes depending on many factors, including load during peeling, shape and quality of the log, and stiffness of the spindles. In this type of system, however, the backup rolls apply pressure to the log with no adjustment. Consequently, either too much or too little pressure is often applied to the log by the backup rolls. If too much pressure is applied, the log is bent toward the knife, so that the peeled veneer becomes thicker than the desired value. Also, too much pressure sometimes shifts the log on the spindle chucks which hold it, thus disrupting the peeling operation. If too little pressure is applied, on the other hand, the bowing cannot be effectively prevented. Thus, it has been found that the forced-feed backup roll system cannot accurately prevent the log from bowing.

The follow-up feed backup roll system typically includes a drive mechanism, such as feed screws, for feeding the backup rolls under control in keeping with the feed rate of the tool post. FIG. 15 shows this type of backup roll system. In this system, the feed screw 25a is control-fed in the centripetal direction of the log 1 to continuously locate the backup rolls 21 in the position where the peripheral surface should be located in the absence of bowing of the log 1. This system can apply pressure to the log in a more stable manner than the forced-feed backup roll system.

Even in the follow-up feed backup roll system, problems arise immediately after the backup rolls come into contact with the log following the aforementioned pre-peeling, by which the log is peeled to an approximately cylindrical shape. The following is an explanation of the problems with reference to FIGS. 2–4. FIG. 2 shows a plan view, and a cross sectional side view taken on line A—A, of the log 1 bowing under load due to cutting resistance during pre-peeling before backup rolls 21 are applied to the log. FIGS. 3 and 4 show enlarged views of the cross sectional view of FIG. 2. For clarity, these drawings do not show parts unnecessary for the explanation. Also, some parts are enlarged or reduced with respect to other parts for the same purpose.

FIG. 2 shows a pair of spindles 6 holding and rotating the log 1 from which veneer 4 is peeled by a knife 4. The log 1 is bowing under load, such as the cutting resistance, so that its peripheral surface is curved toward the backup rolls 21. In FIG. 2, a phantom circle C represents the peripheral surface if the log 1 could be peeled without bowing. This surface will be referred to as "imaginary peripheral surface" hereinafter. A solid circle C1 represents the actual, bowed peripheral surface of the log 1 bowing under load due to peeling. This surface will be referred to as "bowed peripheral surface" hereinafter. The difference between the imaginary peripheral surface C and the bowed peripheral surface C1 is the actual amount Δ of bowing.

The actual amount Δ of bowing is subject to constant change due to many factors including: the load during peeling, the shape and quality of the log, and the stiffness of the spindles. For example, when a relatively stiff tropical log one meter long was peeled to produce veneer 2.4 mm thick with the pressure bars centripetally pressed 0.24 mm (or 10% of the veneer thickness) into the log surface, the bowing was approximately 1 mm within the range of the log diameter from 800 mm to 500 mm. The amount Δ of bowing gradually increased as the peeling proceeded when no backup rolls were used to support the log. It should be noted that the amount of bowing includes a much smaller amount of bowing of the spindles than that of the log.

With reference to FIG. 4, the problems of the conventional follow-up feed backup roll system will be explained in details.

The backup rolls 21 are placed under feed control to press the log to the imaginary peripheral surface while being fed in the centripetal direction in accordance with the feed rate of the tool post. Accordingly, if the backup rolls 21 are advanced to the imaginary peripheral surface C after the log 1 is peeled to an approximate cylinder, the log 1, being peeled in a bowed condition (with S1 as the axis of rotation of the log), is abruptly pushed back to the position indicated by a phantom-line peripheral surface C2 (with S as the reference axis of rotation of the log) at a rate not in keeping with the feed rate of the tool post. This results in defective veneer thicker than the predetermined value by the amount $\Delta$ of bowing. (The cutting of the bowed portion of a log will be referred to as "bowing removal cutting" hereinafter.) Then, the backup rolls are fed in accordance with the feed rate of the tool post, producing veneer with a correct thickness. (This cutting will be referred to as "main cutting" hereinafter.) By this conventional system, therefore, time and effort must be expended to remove the defective part of the veneer from the part with the correct thickness.

As the backup rolls 21 abruptly push back the log, abnormal load is applied to the log. Damage may result, depending on the condition of the log, thereby again affecting the veneer yield. The operator may also be required to remove the damaged part of the veneer or even to suspend the peeling operation.

SUMMARY OF THE INVENTION

In view of the above-identified problems, an object of the present invention is to provide a method for controlling the feed of a backup roll to produce high-quality veneer with a relatively even thickness after the backup roll is brought into contact with a pre-peeled, bowed log.

Another object of the present invention is to provide a method for controlling the feed of a backup roll which prevents damage to a log when the backup roll is brought into contact with the log.

Still another object of the present invention is to provide a method for controlling the feed of a backup roll which improves veneer yields by peeling a log to the minimum peeling diameter at which to terminate the peeling while producing high-quality veneer throughout the operation.

Yet another object of the present invention is to provide an apparatus for controlling the feed of a backup roll to produce high-quality veneer with a relatively even thickness when the backup roll is brought into contact with a pre-peeled, bowed log.

A further object of the present invention is to provide an apparatus for controlling the feed of a backup roll which prevents damage to a log when the backup roll is brought into contact with the log.

Still another object of the present invention is to provide an apparatus for controlling the feed of a backup roll which improves veneer yields by peeling the log to the minimum peeling diameter while producing high-quality veneer throughout the operation.

The above object and other related objects are realized by providing a method of controlling the feed of at least one backup roll of a log backup apparatus for use in a veneer lathe, for feeding the backup roll in the centripetal direction of a log and for preventing the log from bowing while veneer is peeled from the log. The method comprises the step of feeding the backup roll from a control-start diameter $\Phi$ at a provisional feed rate f which is higher than a predetermined feed rate F by a feed rate of a pre-selected correction value $\alpha$ per log rotation where the control-start diameter $\Phi$ is slightly larger than the diameter of the log at which the backup roll is brought into contact with the log. The method further comprises the steps of stopping the feeding of the backup roll at the provisional feed rate f by the time the bowing is eliminated from the log at the latest and thereafter feeding the backup roll at the predetermined feed rate F. According to this method, the bowing that occurs during the veneer peeling is eliminated from the log during the veneer peeling.

According to one aspect of the present invention, the feeding of the backup roll at the provisional feed rate f is stopped when the backup roll has reached a pre-selected control-termination diameter $\phi$ and thereafter the backup roll is fed at the predetermined feed rate F.

According to another aspect of the present invention, the correction value $\alpha$ is given by the following equation:

$$\alpha = \delta/N$$

where $\delta$ is an estimated amount of bowing of the log and N is a pre-selected number of rotations of the log upon completion of which the backup roll reaches a pre-selected control-termination diameter $\phi$ from the control-start diameter $\Phi$. Furthermore, the feeding of the backup roll at the provisional feed rate f is stopped when the backup roll has reached the control-termination diameter $\phi$ upon N rotations of the log, and thereafter the backup roll is fed at the predetermined feed rate F.

According to still another aspect of the present invention, the predetermined feed rate F corresponds to a predetermined thickness of the veneer peeled from the log.

According to yet another aspect, the control-start diameter $\Phi$ approximately corresponds to the addition of twice the estimated amount $\delta$ of bowing of the log to the diameter of the log at the start of the feeding of the backup roll at the provisional feed rate f.

The present invention further provides for a method of controlling the feed of at least one backup roll of a log backup apparatus for use in a veneer lathe, for feeding the backup roll in the centripetal direction of the log and for preventing a log from bowing while veneer is peeled from the log. The method comprises the steps of (i) ringing the backup roll into contact with the log and (ii) calculating an amount $\Delta$ of bowing of the log from the diameter of the log and the position of the backup roll when the backup roll is brought into contact with the log. The method further comprises the steps of: (iii) feeding the backup roll from a control-start diameter $\Phi$ until elimination of the bowing at the latest, at a provisional feed rate f which is higher than a predetermined feed rate F by a feed rate of a correction value $\alpha$ per log rotation, the correction value $\alpha$ being calculated from the amount $\Delta$ of bowing of the log, where the control-start diameter $\Phi$ is the diameter of the log when the amount $\Delta$ of bowing of the log is calculated; (iv) stopping the feeding of the backup roll at the provisional feed rate f by the time the bowing is eliminated from the log at the latest; and (v) thereafter feeding the backup roll at the predetermined feed rate F.

According to one aspect of the present invention, the correction value $\alpha$ is given by the following equation:

$$\alpha = 2 \Delta T/(\Phi - \phi)$$

where T is the thickness of the veneer and $\phi$ is a pre-selected control-termination diameter. Furthermore, the feeding of the backup roll at the provisional feed rate f is stopped when the backup roll has reached the control-termination diameter φ, and thereafter the backup roll is fed at the predetermined feed rate F.

According to another aspect of the present invention, the correction value α is given by the following equation:

$$\alpha = \Delta/N$$

where N is a pre-selected number of rotations of the log upon completion of which the backup roll reaches a control-termination diameter φ from the control-start diameter Φ. Moreover, the feeding of the backup roll at the provisional feed rate f is stopped when the backup roll has reached the control-termination diameter φ upon N rotations of the log, and thereafter the backup roll is fed at the predetermined feed rate F.

The present invention also provides for a log backup apparatus having at least one backup roll for preventing bowing of a log which occurs while veneer is peeled from the log and a control unit for causing the backup roll to be fed in the centripetal direction of the log during veneer peeling, the control unit comprising a compensation controller for controlling the operation of the backup roll so as to: (i) feed the backup roll from a control-start diameter Φ at a provisional feed rate f which is higher than a predetermined feed rate F by a feed rate of a pre-selected correction value α per log rotation where the control-start diameter Φ is slightly larger than the diameter of the log at which the backup roll is brought into contact with the log; (ii) stop the feeding of the backup roll at the provisional feed rate f by the time the bowing is eliminated from the log at the latest; and (iii) thereafter feed the backup roll at the predetermined feed rate F, whereby the bowing that occurs during the veneer peeling is eliminated from the log during the veneer peeling.

The present invention is also directed to a log backup apparatus having at least one backup roll for preventing bowing of a log which occurs while veneer is peeled from the log and a control unit for causing the backup roll to be fed in the centripetal direction of the log during veneer peeling, the control unit comprising a compensation controller for controlling the operation of the backup roll so as to: (i) bring the backup roll into contact with the log; (ii) calculate an amount Δ of bowing of the log from the diameter of the log and the position of the backup roll when the backup roll is brought into contact with the log; (iii) feed the backup roll from a control-start diameter Φ, until elimination of the bowing at the latest, at a provisional feed rate f which is higher than a predetermined feed rate F by a feed rate of a correction value α per log rotation, the correction value α being calculated from the amount Δ of bowing of the log, where the control-start diameter Φ is the diameter of the log when the amount Δ of bowing of the log is calculated; (iv) stop the feeding of the backup roll at the provisional feed rate f by the time the bowing is eliminated from the log at the latest; and (v) thereafter feed the backup roll at the predetermined feed rate F.

According to one practice of the present invention, the correction value α is given by the following equation:

$$\alpha = 2\Delta T/(\Phi - \phi)$$

where T is the thickness of the veneer and φ is a control-termination diameter.

According to anther practice of the present invention, the correction value α is given by the following equation:

$$\alpha = \Delta/N$$

where N is a freely selected number of rotations of the log upon completion of which the backup roll reaches a control-termination diameter φ from the control-start diameter Φ. Furthermore, the compensation controller stops the feeding of the backup roll at the provisional feed rate f when the backup roll has reached the control-termination diameter φ upon N rotations of the log, and thereafter feeds the backup roll at the predetermined feed rate F.

With reference to FIG. 5, a preferred method according to the invention for controlling at least one backup roll of a veneer lathe is explained hereinafter. By this method, the backup rolls are not positioned on the imaginary peripheral surface C of a log while being fed in the centripetal direction of the log. (As explained before, the imaginary peripheral surface C represents the peripheral surface of the log in the absence of bowing.) Rather, the backup rolls are fed from a control-start diameter Φ at a provisional feed rate f which is obtained by increasing a predetermined feed rate F by a feed rate of a pre-selected correction value α per log rotation. The aforementioned control-start diameter Φ is minimally larger than the log diameter at which the backup rolls are brought into contact with the log. The feed rate F is a value determined to peel veneer having a thickness of T. Consequently, the peeled veneer is thicker than T by the correction value α so that the bowing that occurs during the veneer peeling is gradually eliminated from the log during the veneer peeling.

It should be noted that the control-start diameter Φ should be as close to the actual log diameter as possible in order to improve the operating efficiency and yields. To that end, the operator is required to manually position the backup rolls as close to the peripheral surface of the log as possible before starting the feeding of the backup rolls at the provisional feed rate f.

Alternatively, if an estimated amount δ of bowing is previously entered into a control unit 41 (to be explained in detail hereafter), the backup rolls can be automatically transferred to a position close to, but not in contact with, the bowed peripheral surface C1 and then fed at the provisional feed rate f under the control of the unit 41.

Still referring to FIG. 5, the invention is explained in further detail. As explained above, if the backup rolls 21 are brought into contact with, and fed to, the imaginary peripheral surface C, the peeled veneer becomes thicker than the desired value by the amount Δ of bowing. On the other hand, if the backup rolls 21 are fed at the predetermined feed rate F from the control-start diameter, it is not possible to prevent the log 1 from bowing since the knife 15 is fed at the same rate, so that the clearance H between the log 1 and the backup rolls 21 does not decrease. Rather, the backup rolls are fed at the provisional feed rate f which is obtained by increasing the predetermined feed rate F by a feed rate of a pre-selected correction value α per log rotation. Consequently, the clearance H decreases until completely eliminated and thereafter the backup rolls 21 are brought into contact with the log so as to gradually eliminate the bowing from the log and to concurrently prevent further bowing. As a result, the peeled veneer is thicker by the correction value α. However, this value can be set such that the extra thickness is well within a tolerable and insignificant range for the subsequent process steps and market. Then, the feeding of the backup rolls at the provisional feed rate f is stopped by the time it is considered that the bowing is eliminated from the log at the latest, that is, when the backup rolls 21 have reached the imaginary peripheral surface C3, which corresponding to the position of the tool post. From here on, the backup rolls are fed at the predetermined feed rate F.

In another practice of the invention, the backup rolls are fed at the provisional feed rate f in the range from the control-start diameter Φ to a predetermined control-termination diameter φ. The feeding of the backup rolls at the provisional feed rate f is stopped either when the control-termination diameter φ is reached or by the time it is determined that the bowing has been eliminated from the log at the latest. This method is suitable for a veneer lathe which supports a log with double spindles. The bowing can be eliminated before the large spindles are disengaged from the log by setting the control-termination diameter φ to a value slightly larger than the diameter of the larger spindles. By the time only the small spindles support the log, the bowing has already been eliminated with the backup rolls and the tool post pressing the log from the opposite sides. In this way, the log, although easier to bow because it is thinner, can be prevented from bowing as the backup rolls and the tool post are fed at the same rate F.

In still another mode of practicing the invention, the backup rolls can be fed at the provisional feed rate f in the range from the control-start diameter until the log completes N rotations to reach the control-termination diameter in order to eliminate the bowing from the log. In this case, the provisional feed rate f of the backup roll is obtained by increasing a predetermined feed rate F by a feed rate of a pre-selected correction value α for each rotation the log:

Correction value α=δ/N where δ is an estimated amount of bowing and N is a number of rotations of the log upon completion of which the backup rolls reach the control-termination diameter φ from the control-start diameter. The backup rolls starts to be fed at the predetermined feed rate F either when the log has completed N rotations or at the latest by the time the bowing has been eliminated even before the log completes N rotations.

In the above-explained modes of practicing the present invention, the amount of bowing of the log is first estimated to determine the feed rate of the backup rolls. It is possible, however, to control the feed of the backup rolls based on the actual amount Δ of bowing obtained by measurement as in the modes of practicing the invention explained below. To measure the actual amount Δ of bowing of the log, the backup rolls are transferred in the centripetal direction of the log until coming into contact with the log. Next, the position of the backup rolls is detected when they touch the log 1 being peeled. As the detected position of the backup rolls represents the log diameter corresponding to the bowed peripheral surface C1 at this moment, the actual amount Δ of bowing can be given by calculating the difference between the log diameter corresponding to the imaginary peripheral surface C and that corresponding to the bowed peripheral surface C1.

The diameter of the log being peeled when the actual amount Δ of bowing is measured is designated as the control-start diameter Φ. In one mode of practicing the invention, the amount A of bowing is eliminated from the log between the control-start diameter Φ and a predetermined control-termination diameter φ. To this end, the backup rolls are fed at the provisional feed rate f which is higher than the predetermined feed rate F by the feed rate of the correction value α per log rotation, with the correction value α given by the following equation:

α=2ΔT/(Φ−φ)

where T is the thickness of the peeled veneer. The provisional feed rate f is changed to the predetermined feed rate F either when the control-termination diameter φ is reached or by the time the bowing is eliminated from the log at the latest.

In another mode of practicing the invention, the backup rolls are fed at the provisional feed rate f in a range from the control-start diameter Φ until the log rotates N times to eliminate the actual amount of bowing. In this case, the provisional feed rate f of the backup roll is obtained by increasing a predetermined feed rate F by the feed rate of a pre-selected correction value α per log rotation, with the correction value α calculated from the following equation:

Correction value α=Δ/N where Δ is the actual amount of bowing and N is the number of rotations of the log upon completion of which the backup rolls reach the control-termination diameter φ from the control-start diameter. The backup rolls starts to be fed at the predetermined feed rate F either when the log has completed N rotations or by the time the bowing has been eliminated at the latest.

BRIEF DESCRIPTION OF THE DRAWINGS

For a fuller understanding of the nature and objects of the present invention, reference should be made to the following detailed description and the accompanying drawings, in which.

DETAILED DESCRIPTION OF THE PREFERRED EMBODIMENTS

Figure 1:
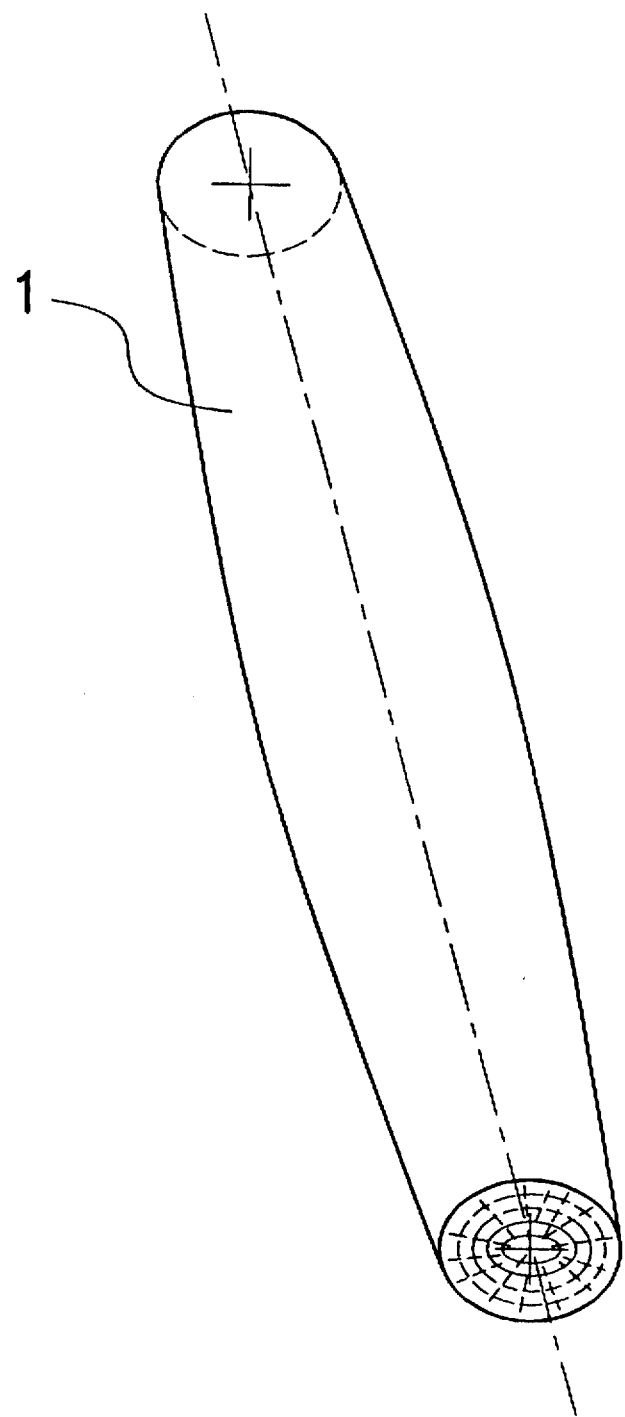
FIG. 1 shows the peeled core of a log in a bowed condition.
Figure 2:
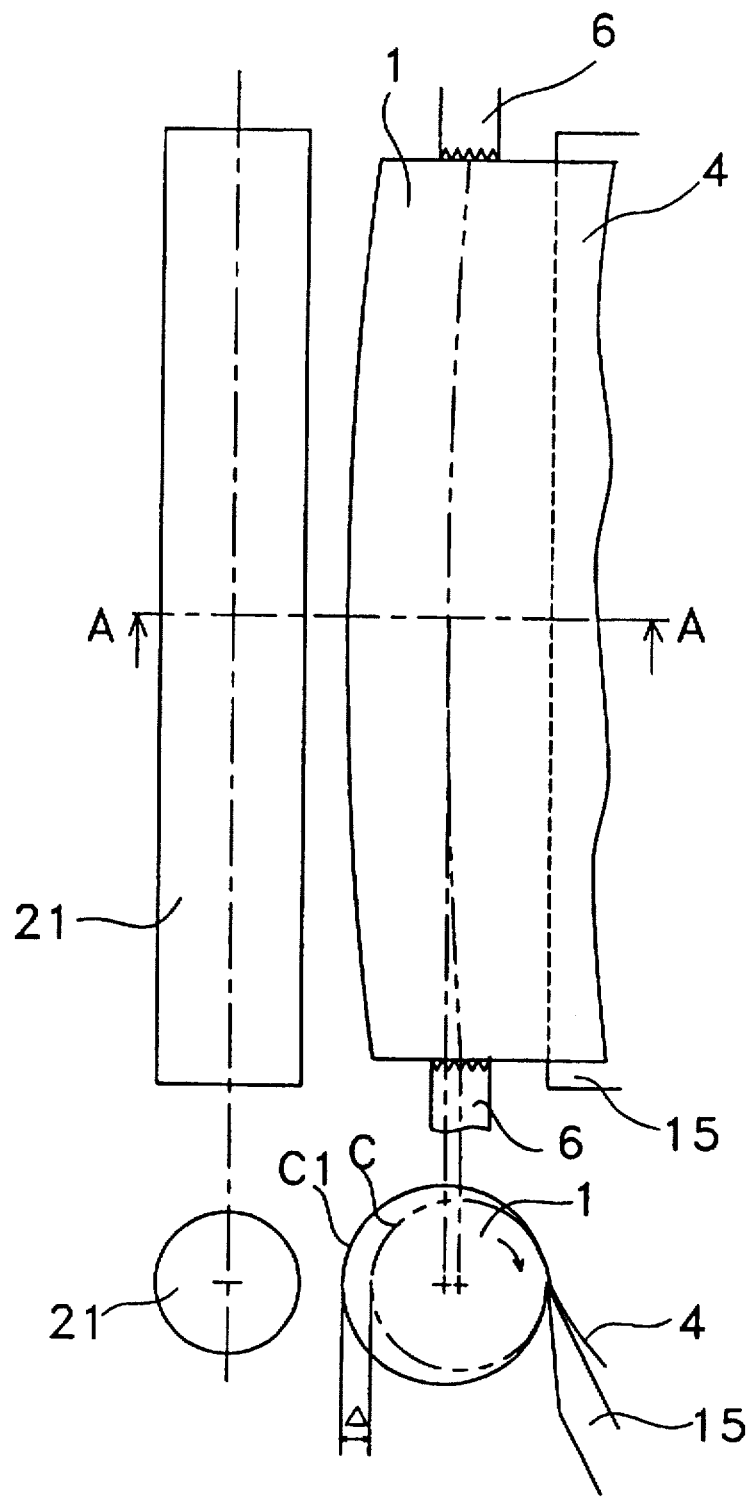
FIG. 2 shows a plan view, and a cross sectional side view taken on line A—A, of backup rolls and a log bowing under load due to cutting resistance during pre-peeling.
Figure 3:
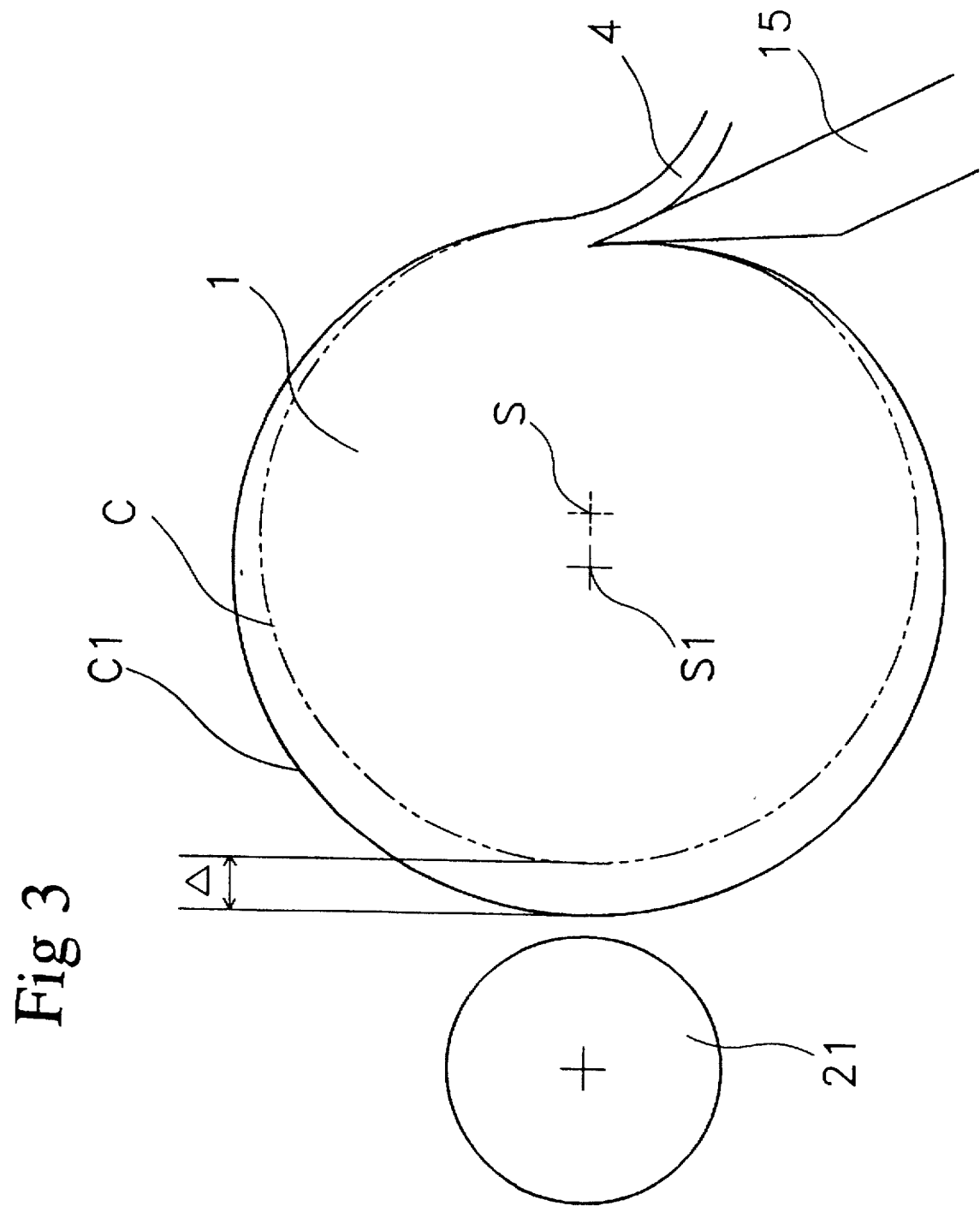
FIG. 3 is an enlarged view of the cross sectional view of FIG. 2.
Figure 4:
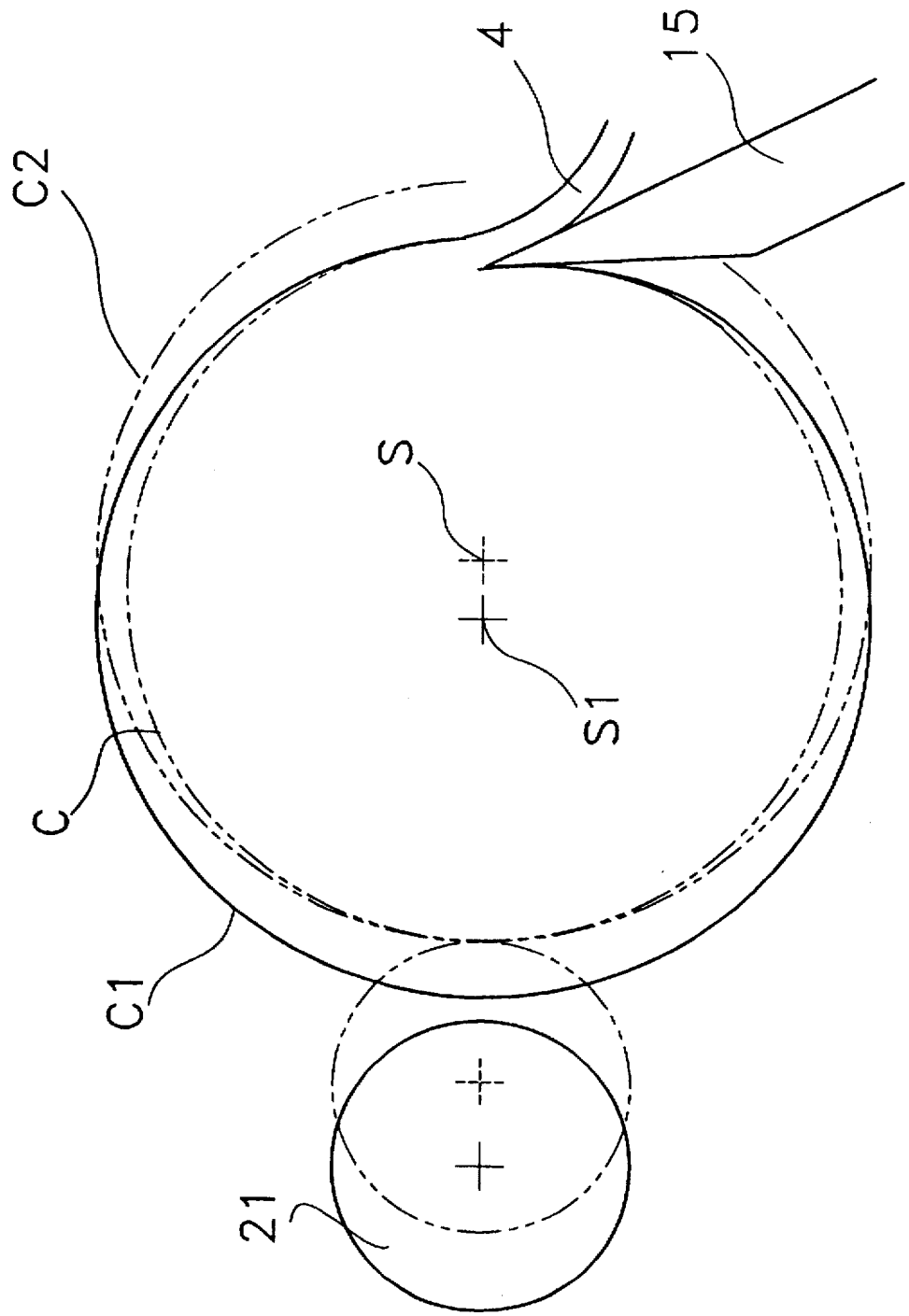
FIG. 4 is a cross sectional view of the backup rolls and the log of FIG. 2 during bowing removal cutting by a conventional method.
Figure 5:
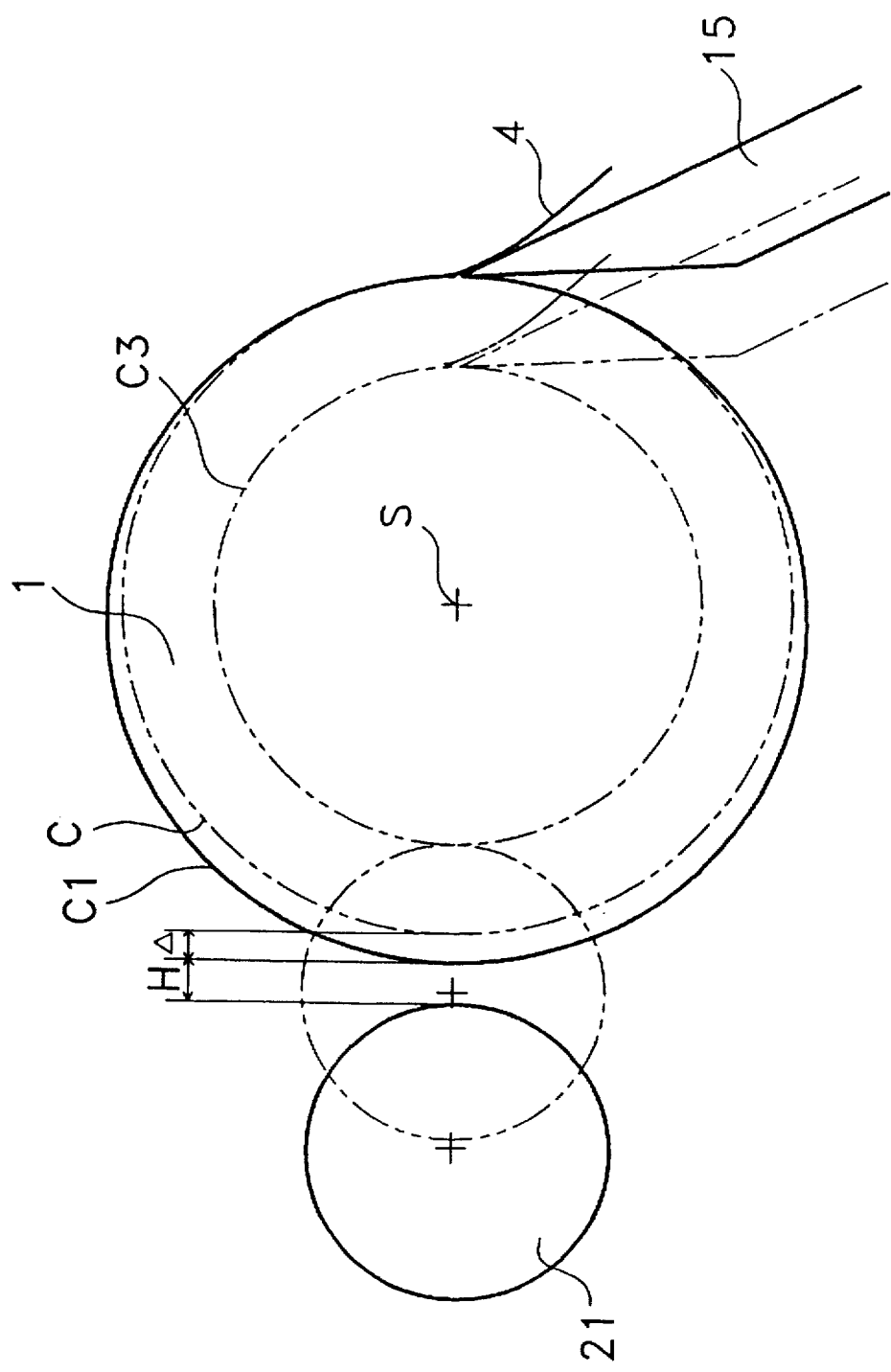
FIG. 5 is a cross sectional view of the veneer lathe of FIG. 2 carrying out a method of feeding the backup rolls in accordance with the present invention.
Figure 6:
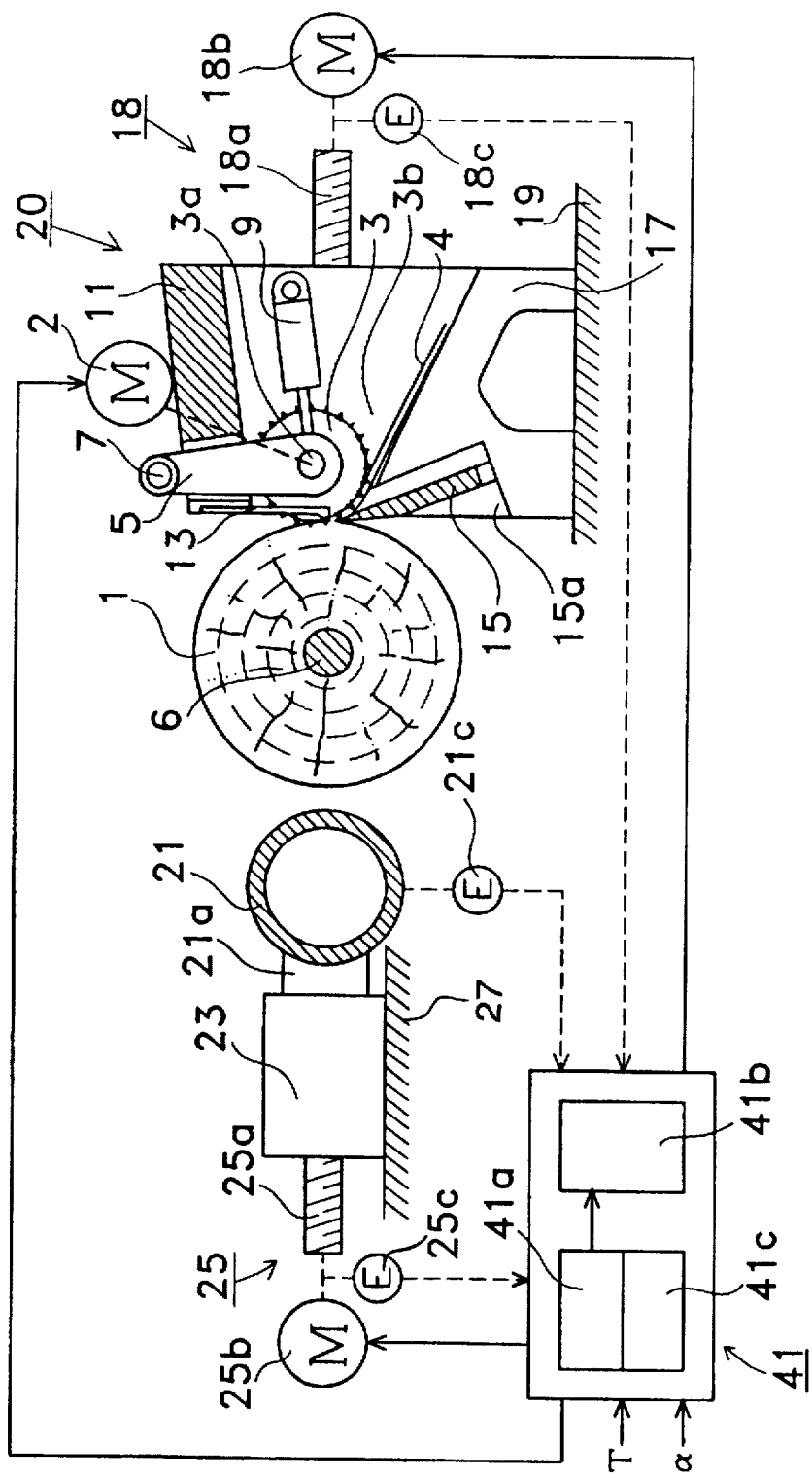
FIG. 6 is a cross sectional side view of the peripheral-drive veneer lathe for carrying out a first embodiment in accordance with the present invention.
Figure 7:
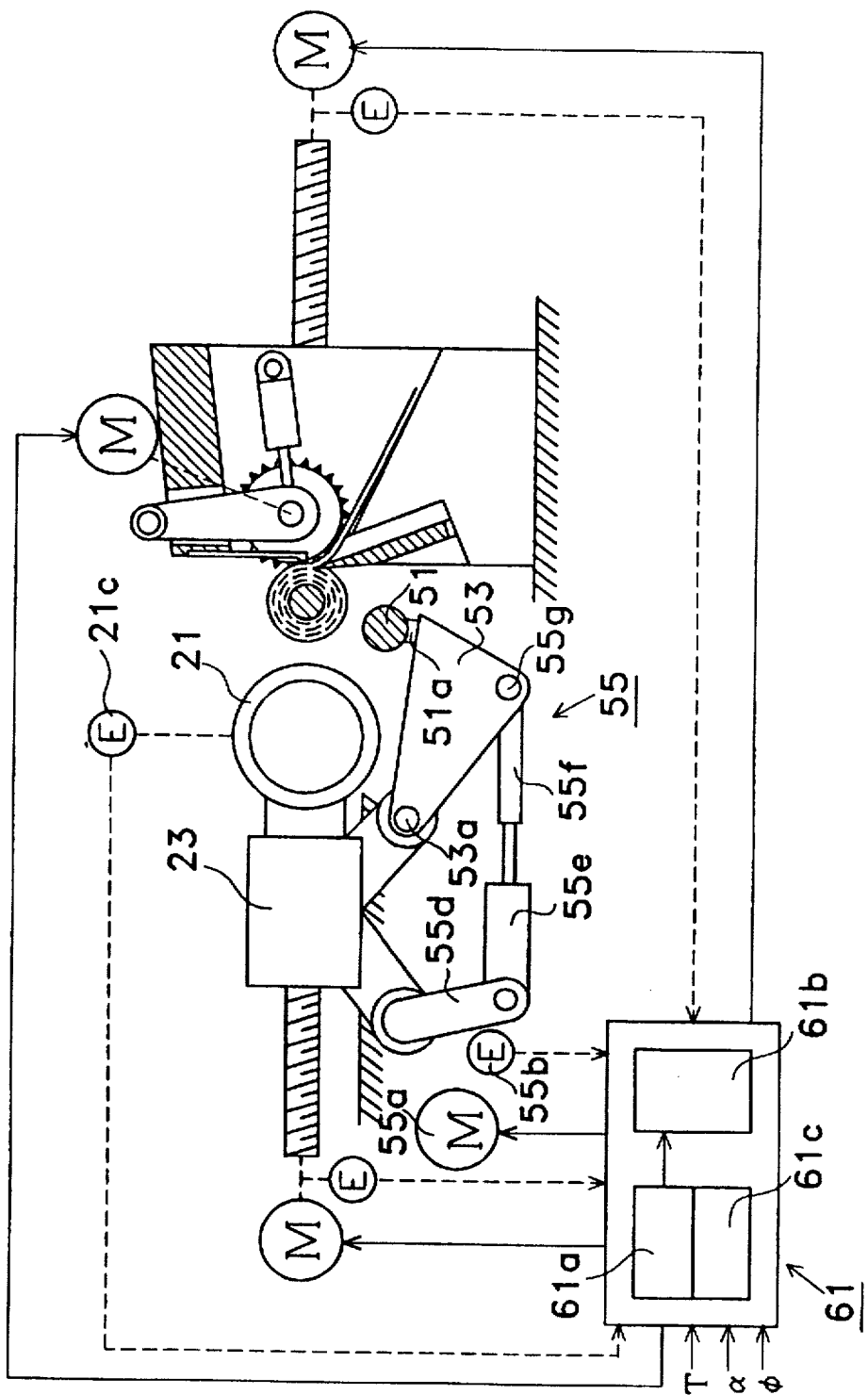
FIG. 7 is a cross sectional side view of a peripheral-drive veneer lathe for carrying out a second embodiment in accordance with the present invention.
Figure 8:
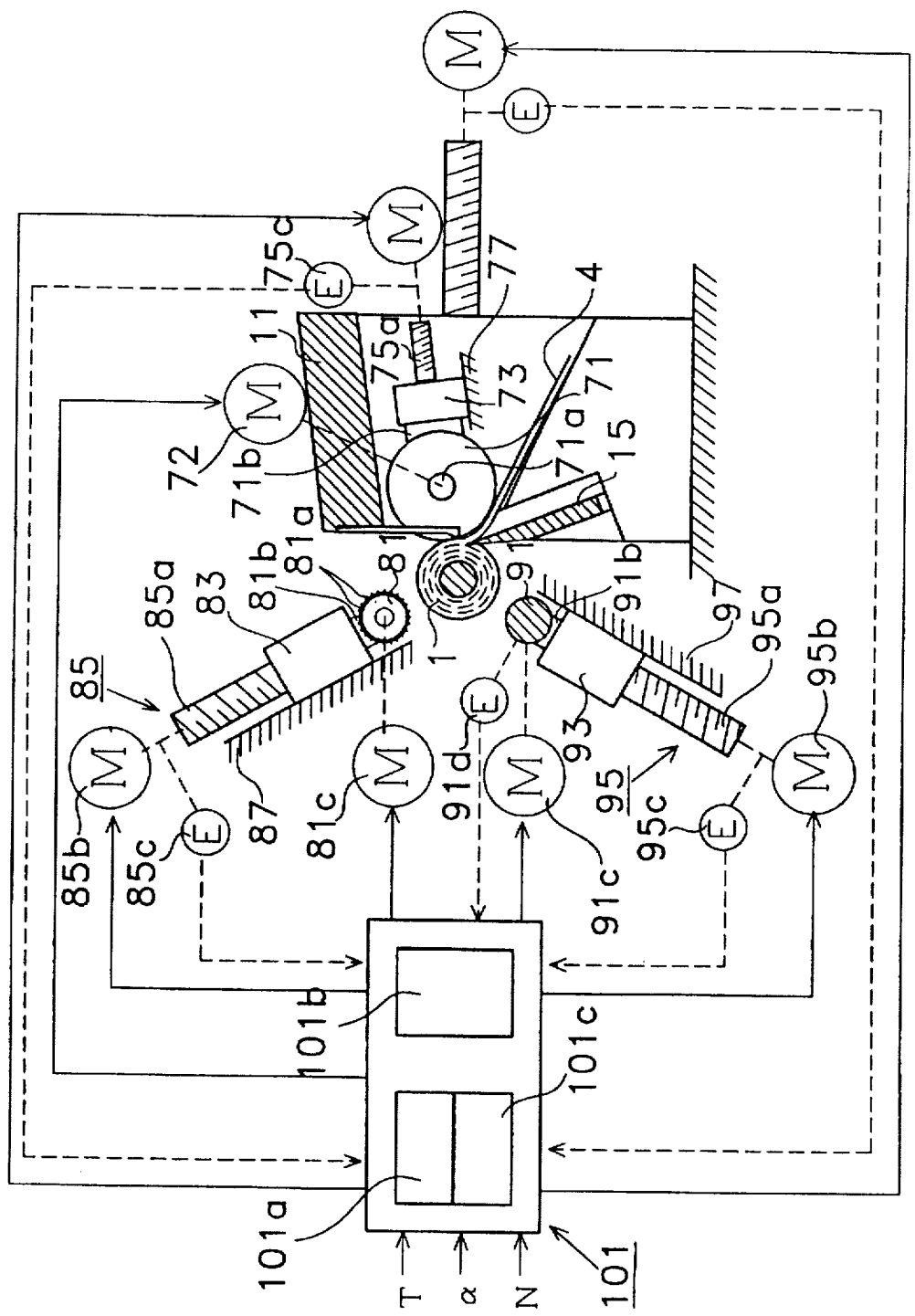
FIG. 8 is a cross sectional side view of a peripheral-drive veneer lathe for carrying out a third embodiment in accordance with the present invention.

The present invention will be more particularly described with reference to the accompanying drawings. FIGS. 6–8 show a side view of three peripheral-drive lathes with the identical basic structure embodying the present invention.

Embodiment 1

FIG. 6 is a side view of the veneer lathe of the first embodiment. In the drawing, reference numeral 1 generally designates a log from which a veneer 4 is peeled. The log 1 is held at its both ends by a pair of so-called "double spindles" 6 (only one shown) each of which is composed of a large spindle and a small spindle. While the diameter of the log is large, large spindles are used to hold the log. The large spindles are removed from the log when the log is peeled to a small diameter.

Reference numeral 3 is a plurality of sectional peripheral drive rolls disposed at axially spaced intervals on a common drive shaft 3a. Each drive roll 3 has a number of spikes 3b which are arranged on the periphery thereof to be engageable with the peripheral surface of the log 1. The drive shaft 3a receives from a peripheral drive motor 2 mounted on a support block 11 the driving force required for veneer peeling. A constant-speed-drive, three-phase induction motor will suffice for the peripheral drive motor 2.

The drive shaft 3a is supported by pivotal arms 5 (only one shown) attached to a pivot 7 located above the peripheral drive rolls 3 such that the peripheral drive rolls 3 are pivotal on the pivot 7. During veneer peeling, the peripheral drive rolls 3 are constantly pressed by a pressure member 9 against the log 1 so that the peripheral drive rolls 3 can be displaced toward the log 1 while the diameter of the log 1 decreases as the peeling operation proceeds. Accordingly, the spikes 3b are constantly engaged with the peripheral surface of the log 1, ensuring that the torque required for veneer peeling is transmitted to the log There is indicated at 15 a veneer knife fasten to a tool post 17 with a knife wedge 15a. Reference numeral 13 designates a plurality of pressure bars secured to the support block 11. Each pressure bar 13 is positioned between each two adjacent drive rolls 3 on the drive shaft 2c with its lower end positioned slightly above, and on the veneer conveying side of, the cutting edge of the veneer knife 15 for applying pressure to the log 1 adjacent to the position where the cutting edge of the veneer knife 15 is engaged with the log 1. The pressure bars 13 effectively prevent the veneer 4 from being split in the process of peeling.

Reference numeral 18 designates a feed mechanism that includes a plurality of rotatable feed screws 18a (only one shown), such as ball threads, a feed-screw motor 18b, such as a servomotor, and a position detector 18c, such as a rotary encoder. The rotatable feed screws 18a are engaged with the tool post 20 having the veneer knife 15 carried thereon. The feed-screw motor 18b, under the control of a control unit 41 (to be explained in detail hereinafter), rotates the rotatable feed screws 18a to cause the tool post 20 to reciprocate along a predetermined path at a desired feed rate, thereby peeling veneer with a predetermined thickness. The support block 11 is provided with a lifting cylinder (not shown) for lifting open one end of its top cover to allow inspection and maintenance.

Designated at numeral 21 is a plurality of freely rotatable, sectional horizontal backup rolls provided on a support frame 23 via a bearing box 21a. Alternatively, a single backup roll may be provided instead of the plurality of sectional rolls. The rotational axis of the horizontal backup rolls 21 lies approximately diametrically opposite to that of the peripheral drive rolls 3 across the log 1 on the same or approximately same plane as the rotational axis of the log 1. The backup rolls 21 are brought into contact with the peripheral surface of the log 1 to prevent the log 1 from bowing in a horizontal direction during peeling.

Reference numeral 21c denotes a rotational angle detector, such as a rotary encoder, for detecting rotation of the backup rolls 21 immediately after the rolls 21 comes into contact with the log 1. The rotational angle detector 21c then sends data on the detection to the control unit 41. The support frame 23 is mounted on a slide surface 27 and allowed to reciprocate along a predetermined path in a horizontal direction by a shifting mechanism 25.

The shifting mechanism 25 includes a plurality of rotatable lead screws 25a, such as ball threads, a lead screw feeding motor 25b, such as a servomotor, a position detector 25c, such as a rotary encoder. One end of each lead screw 25a is connected to the support frame 23 via a bearing box (not shown). The feed rate of the backup rolls 21 is controlled by the control unit 41 to force-feed or follow-up feed the backup rolls 21 so that the rolls 21 can stay engaged with the peripheral surface of the log 1 as the diameter of the log 1 decreases in the process of peeling. Also, the shifting mechanism 25 can cause the horizontal backup rolls 21 to reciprocate at a desired rapid traverse rate.

The control unit 41 includes a controller 41a, a compensator 41c, and a driving signal transmitter 41b for controlling the operation of the above-described motors 2, 18b, and 25b with a pre-installed program. The control unit 41 is constructed as a microcomputer including a CPU (central processing unit) a ROM (read only memory), and a RAM (random access memory) although these elements are not shown in the drawing. The controller 41a receives output signals from the detectors 18c, 21c, and 25c and a veneer thickness set value T as its input signals and manipulates the received data with the pre-installed program. The driving signal transmitter 41b transmits to the motors 2, 18b, and 25b the driving signals calculated by the controller 41a from the signals received from the detectors 18c, 21c, and 25c. The compensator 41c calculates the provisional feed rate f from the veneer thickness T and a correction value α with which to correct the operation of the controller 41a.

Each of the motors 2, 18b, and 25b may be controlled independently during preparation before or after veneer peeling by means of manual or semiautomatic operation; however, the computer program stored in the control unit 41 controls the operation of all these motors 2, 18b, 25b, and 35b in a conjunctive manner during veneer peeling.

Prior to the veneer peeling operation, the log 1 having an irregular peripheral surface is held between a pair of spindles 6 and driven by respective spindle motors (not shown) to rotate idly with the spindles. At the same time, the tool post 20 is moved toward the log by the feed mechanism 18 at a desired rapid traverse rate until the veneer knife 15 mounted on the tool post 20 is brought into contact and cutting engagement with the periphery of the rotating log 1. While the tool post 20 is moved toward the log 1, the rotational speed of the spindle motor and the rapid traverse rate of the feed mechanism 18 may be set arbitrarily by means of manual or semiautomatic operation. However, by the time the veneer knife 15 is brought into contact with the periphery of the rotating log 1, the rotational speed of the spindles 6 is controlled by the computer program to correspond to or follow the driving speed of the peripheral drive rolls 3. At the same time the feed rate effected by the feed mechanism 18 is also controlled by the computer program to correspond to the rotational speed of the spindles calculated from the information obtained by a spindle rotational angle detector (not shown).

During automatic operation, the backup rolls 21 are controlled to be fed in accordance with the feed of the tool post 20. It is possible to only feed the tool post by setting the feed selector switch (not shown) of the backup rolls 21 to the manual operation. This is particularly desirable if a log has bark on the surface or a crack therein. If such a log is pressured by the backup rolls, an abnormal load may be applied to the log. Consequently, the log may break or the crack may spread, thus causing the peeled veneer to be stuck on the cutting edge of the knife. However, once the log is peeled to an approximately cylindrical shape, the feed selector switch may be changed to the automatic operation. Then, the backup rolls 21 are moved to a position determined by the control unit 41 from which they are fed at an appropriate rate.

Figure 10:
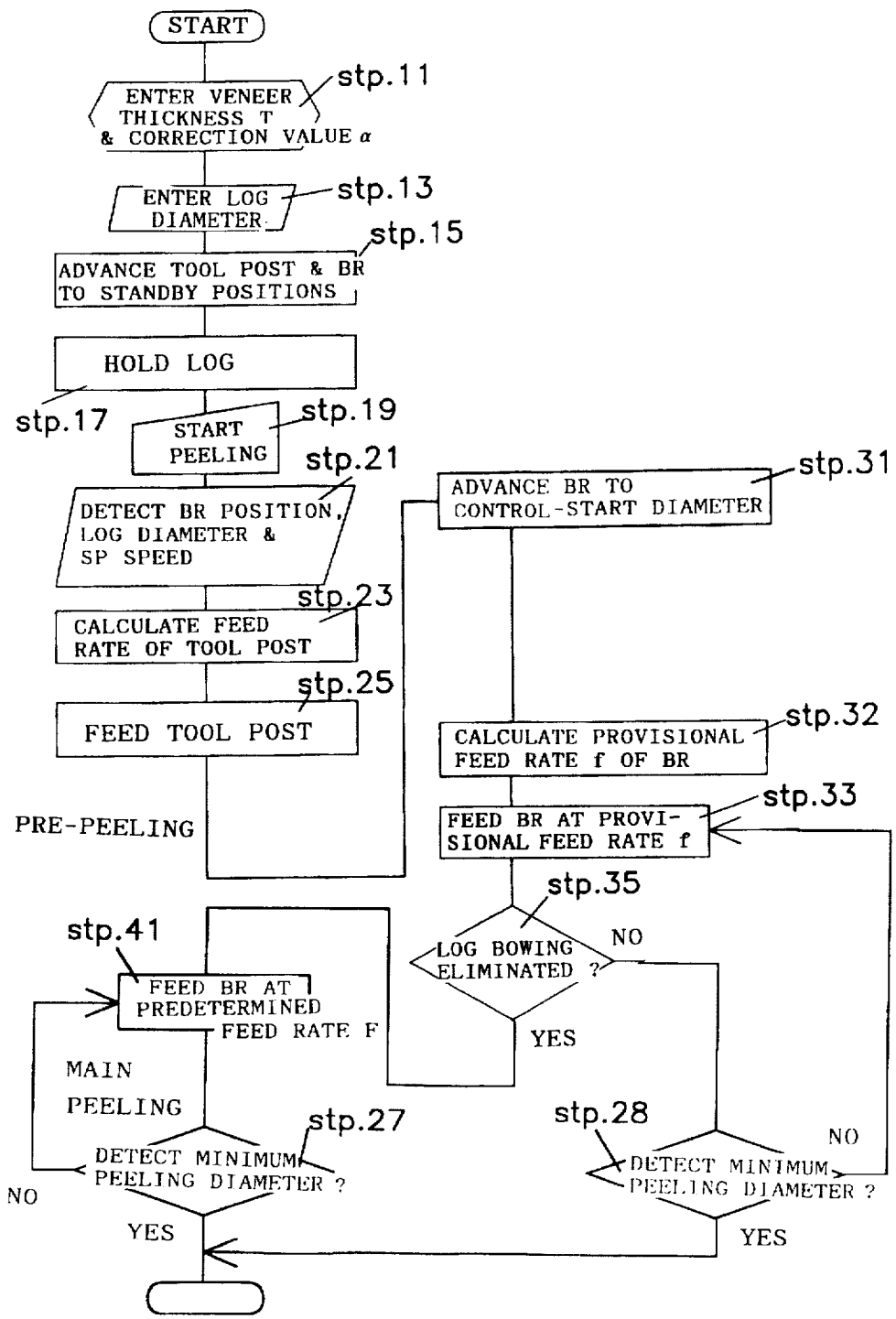
FIG. 10 is a flowchart explaining the method of the first embodiment for controlling the feed of the backup rolls in which the feeding of backup rolls at a provisional feed rate based on an estimated log bowing is terminated at the latest by the time the bowing is eliminated from the log.

Referring to the flowchart of FIG. 10, the method of controlling the feed of the backup rolls is explained hereinafter. This control method may be stored on a storage medium, such as a magnetic disk or a CD-ROM, as a computer program for operating the veneer lathe and may be loaded into the controller 41a as required. Alternatively, such storage medium may be pre-installed in the veneer lathe.

In the first, second, and third embodiments, 2.5 mm thick veneer is peeled from a log with a maximum diameter of 600 mm before peeling in which bowing of 1 mm is to occur during peeling operation. The backup rolls are fed at a provisional feed rate with the correction value α set to 0.05 mm in the embodiments.

Before starting the peeling operation, a veneer thickness T of 2.5 mm and a correction value α of 0.05 mm are entered into the controller 41a to calculate the provisional feed rate of the backup rolls 21 in step 11. The maximum log diameter of 600 mm is also entered into the controller 41a in step 13. The maximum log diameter is measured on a log charger (not shown) in an earlier step of centering of the log.

In step 15, the tool post 20 and the backup rolls 21 are advanced to, and remain in, their respective standby positions where the log can be still loaded into the veneer lathe and held by the spindles 6 (the backup rolls are referred to as "BR" in all the flowcharts). The program proceeds to step 17 in which the log is loaded into the veneer lathe and held by the spindles 6.

If the standby positions are far away from the log, the idling time increases, thus reducing the operating efficiency of the veneer lathe. Therefore, it is preferable to position the tool post 20 and the backup rolls 21 fairly close to the log with a small clearance.

The operation up to step 17 can be carried out automatically. However, it is preferable if the operator manually performs the next step 19 using the peeling start switch (not shown) for safety. At this time, the backup rolls 21, if they are too far away from the log, may also be moved closer by manual operation. The tool post 20 and the backup rolls 21 can be automatically operated throughout the remaining steps from bowing removal cutting until the next log is loaded.

After the peeling is started by depressing the peeling start switch, the current diameter of the log and the current position of the backup rolls 21 are continuously detected by the position detector 18c and the rotational angle detector 21c, respectively, and are entered into the controller 41a in step 21. Concurrently, the signal representative of the rotational speed of the spindles is continuously generated by a spindle rotational angle detector (not shown) and entered into the controller 41a in the same step (the spindles are referred to as "SP" in all the flowcharts).

In step 23, the feed rate F of the tool post 20 is calculated from the veneer thickness T, the signal representing the spindle rotational speed, and the signal representing the diameter of the log. The process goes on to step 25 in which the tool post is fed toward the log at the feed rate F to start pre-peeling. The backup rolls are not yet fed at this time since the manual operation is selected for the backup rolls during the pre-peeling.

Once the log 1 is peeled to an approximately cylindrical shape, the operation of the backup rolls 21 is switched from the manual operation to the automatic operation to carry out backup roll feeding as follows: first, the shifting mechanism 25 automatically transfers the backup rolls 21 from the standby position to a position very close to the bowed peripheral surface C1, which is 2 mm outside of the imaginary peripheral surface C. This automatic transfer of the backup rolls is executed at a feed rate independent of the feed of the tool post. The log diameter which corresponds to this very close position of the backup rolls, and which is slightly larger than the diameter at which the backup rolls later come into contact with the log, is designated as the control-start diameter (step 31). The 2 mm is accounted for by the estimated bowing of 1 mm of the log and a 1 mm margin. Therefore, if the actual amount Δ of bowing is less than 2 mm, the backup rolls 21 do not come into contact with the log. Also, this amount can be changed by the operator upon visual inspection.

In step 32, the provisional feed rate f of the backup rolls is calculated by increasing the feed rate F by the feed rate of the correction value α for each rotation of the log. In other words, the provisional feed rate f is greater than the feed rate F by the feed rate of the correction value α per log rotation. (The feed rate F is calculated from veneer thickness T and the signals representing the spindle rotational speed and the diameter of the log in step 23. The correction value α is entered in step 11.) The backup rolls 21 are fed at this provisional feed rate f from then on to correct the bowing in step 33.

Figure 9:
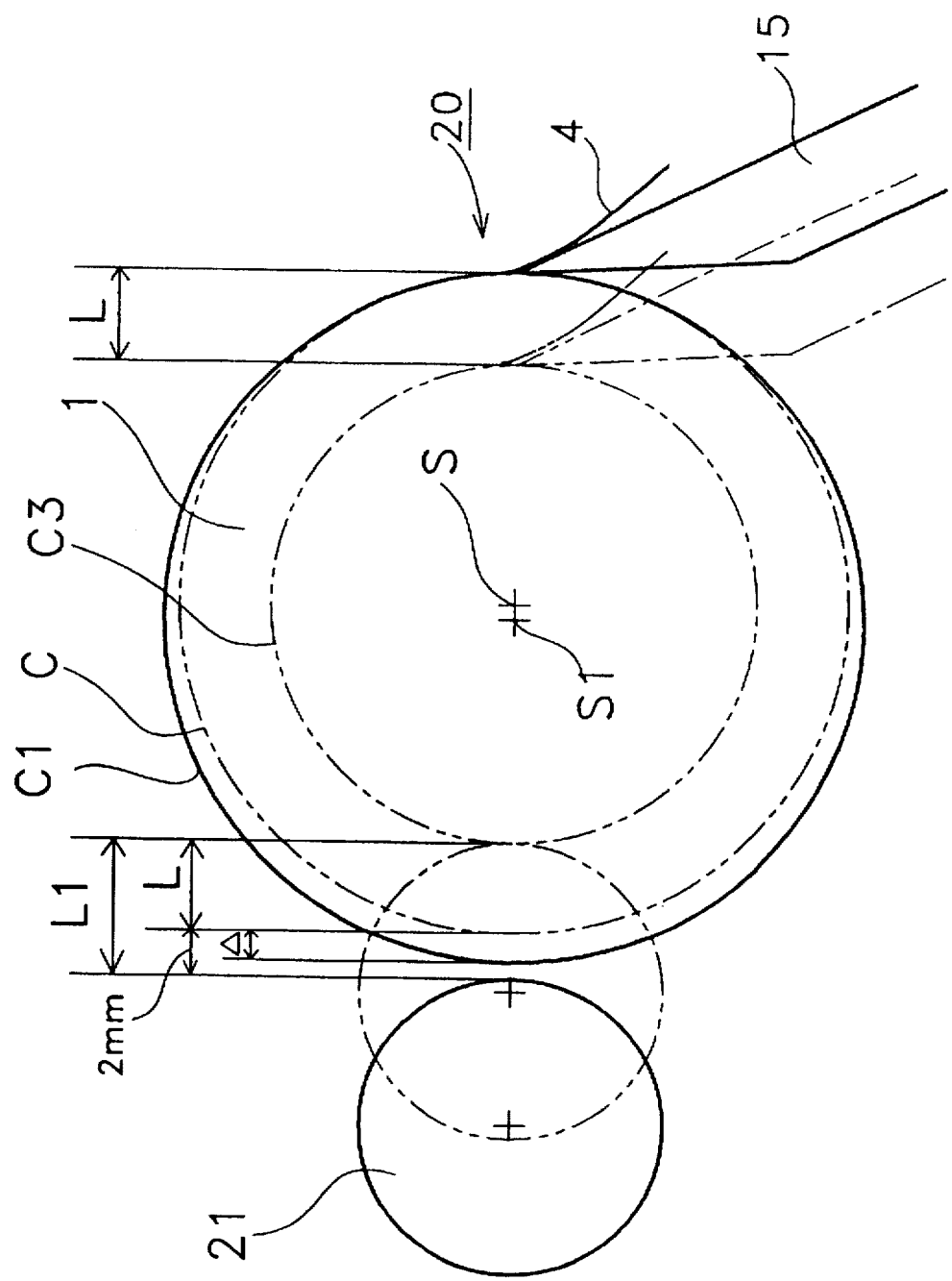
FIG. 9 shows the bowing of a log immediately before the bowed portion of the log begins to be eliminated.

The following is an explanation of the process of correcting the bowing of the log 1. FIG. 9 shows the log 1 during bowing removal cutting. The log 1 has been pre-peeled with bowing by an amount Δ. Meanwhile, the backup rolls 21 are positioned on the control-start diameter, which is 2 mm from the imaginary peripheral surface C. A circle C3 of a two-dot chain line represents the imaginary peripheral surface when the amount Δ of bowing is zero upon elimination of the bowing from the log. This means the imaginary peripheral surface C coincides with the bowed peripheral surface C1 when the bowing is eliminated.

For the bowed peripheral surface C1 to coincide with the imaginary peripheral surface C3, the tool post 20 is fed by a distance L in the centripetal direction of the log at the rate of T mm (the thickness of the veneer) per rotation of the log 1 (at the feed rate F) while the backup rolls 21 are fed by a distance L1 which is the addition of distance L to 2 mm (the distance between the backup rolls 21 and the imaginary peripheral surface C) in the same time period.

In this embodiment, the provisional feed rate f of the backup rolls is 2.55 mm per rotation of the log. This is obtained by increasing the predetermined feed rate F of 2.5 mm per log rotation by the feed rate of the pre-selected correction value α of 0.05 mm per log rotation. At this provisional feed rate f of the backup rolls, the distance of 2 mm between the backup rolls 21 and the imaginary peripheral surface C is reduced by 0.05 mm for each rotation of the log until completely eliminated upon 40 rotations of the log. In other words, when the log 1 has completed 40 rotations, the backup rolls 21 reach the imaginary peripheral surface C3.

If the amount Δ of bowing is 1 mm, the distance between the backup rolls 21 and the imaginary peripheral surface C is also 1 mm. Accordingly, the backup rolls 21 do not come into contact with the bowed peripheral surface C1 at this provisional feed rate f until after the log rotates 20 times. The bowing is gradually eliminated from the log during the remaining 20 rotations of the log as explained above.

The provisional feed rate f is applicable if the rotational axis of the backup rolls 21 is located on the same horizontal plane as the rotational axis of the spindles. If the rotational axis of the backup rolls 21 is located either above or below the plane, the backup rolls need to be fed at an adjusted rate that compensates for the displacement of their axis from the plane.

As explained before, the diameter of the log and the position of the backup rolls 21 are continuously detected during peeling, so that it is possible to determine the actual amount Δ of bowing based on the signals representing the log diameter and the position of the backup rolls 21. More specifically, the difference between the positions of the backup rolls and the imaginary peripheral surface C can be safely considered as the actual amount Δ of bowing. As the log is slightly deformed when pressed by the backup rolls, however, it is possible to take the amount of deformation into account to calculate the actual amount Δ of bowing more accurately.

In step 35, it is determined whether or not the backup rolls 20 has reached the imaginary peripheral surface C3. If YES, the bowing of the log is considered to have been eliminated. Then, the process goes on to step 41 in which the provisional feed rate f of the backup rolls is replaced with the feed rate F to start main peeling of veneer having the prescribed thickness of 2.5 mm. This makes it possible to peel veneer from the log while keeping it from further bowing. When the minimum peeling diameter or the diameter at which to terminate the peeling is detected in step 27, the backup rolls and the tool post are stopped to terminate peeling.

On the other hand, if it is determined that the bowing has not been eliminated yet in step 35, in other words, if NO in this step, the process goes to step 28 in which it is determined whether the minimum peeling diameter is detected. If NO, the backup rolls 21 continue to be fed at the provisional feed rate f. Furthermore, if the minimum peeling diameter is detected (or if YES) at step 28 while it is determined that the log is still bowed (or if NO) at step 35 with the backup rolls still fed at the provisional feed rate f, the peeling operation is terminated without going through step 41 in which the backup rolls 21 are fed at the feed rate F.

According to this method of controlling the feed of the backup rolls, the bowing is gradually eliminated from the log as peeling proceeds. The portion of veneer produced during bowing removal cutting has quite a higher quality with a fairly uniform thickness than the same portion of veneer peeled by conventional methods which is usually discarded due to poor quality.

Even if the bowed portion is not completely eliminated from the log by the end of peeling operation, it is not abruptly eliminated all at once when the backup rolls come into contact with and press the log as in the above-explained prior art methods. Thus, the problem of the prior art methods are solved by this embodiment.

Embodiment 2

FIG. 7 is a side view schematically illustrating an alternate spindleless veneer lathe to which the present invention is applied as a second embodiment. Parts similar to those previously described with reference to FIG. 6 are denoted by the same reference numerals, so that the description thereof is dispensed with.

Reference numeral 51 denotes a plurality of freely rotatable, sectional vertical backup rolls provided on a support frame 53 via bearing boxes 51a. The rotational axis of the vertical backup rolls 51 lies approximately vertically below the rotational axis of the log 1. The vertical backup rolls 51 are brought into contact with the peripheral surface of the log 1 to prevent the log 1 from bowing vertically. The support frame 53 is rotatably connected to the support frame 23 of the horizontal backup rolls 21 via a pivotal shaft 53a. The support frame 53 are also connected to a lifting gear 55. The vertical backup rolls 51 are capable of moving approximately vertically toward and away from the rotational axis of the log 1.

The lifting gear 55 includes a lifting gear motor 55a, such as a servomotor, a position detector 55b, such as a rotary encoder, a final reduction gear 55c for receiving driving force from the lifting gear motor 55a, a rotatable arm 55d connected to the output shaft of the final reduction gear 55c, a buffer 55e, a coupler 55f, and a support shaft 55g.

The purpose of providing the buffer 55e, which includes a compression spring, is to absorb any overload to prevent resultant damage of the lifting gear 55 or undesirable displacements of the vertical backup rolls 51. Such an overload is caused by, for example, wood splinters stuck between the log 1 and the vertical backup rolls 51.

Denoted by a reference numeral 61 is a control unit for controlling the overall operation of the motors. The control unit 61 comprises a controller 61a for performing operations with an installed program on various input signals received from the aforementioned detectors. These input signals includes a veneer thickness set value T, a correction value α, and a pre-selected log diameter φ. The control unit 61 also includes a driving signal transmitter 61b for transmitting the output signals received from the controller 61a to the motors to control the operation thereof. Also included is a compensator 61c for correcting the operation of the controller 61a by calculating a provisional feed rate f from the veneer thickness T and the correction value Δ.

Each of the motors may be controlled independently during preparation before or after veneer peeling by means of manual or semiautomatic operation; however, a computer program is stored in the control unit 61 for controlling the operation of all these motors in a conjunctive manner during veneer peeling.

Figure 11:
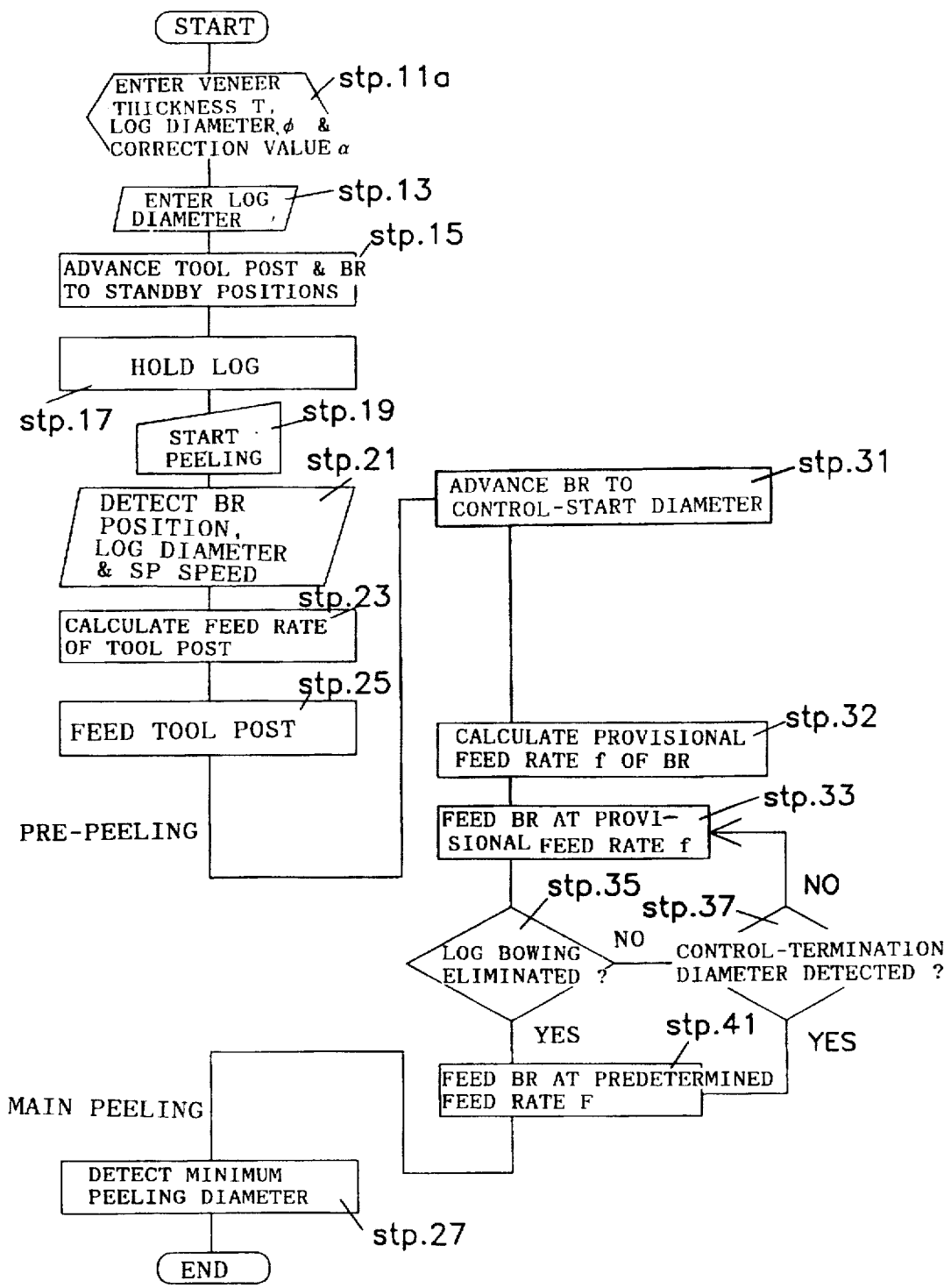
FIG. 11 is a flowchart explaining the method of the second embodiment for controlling the feed of backup rolls.

The method of controlling the feed of the backup rolls of this embodiment, as compared with the method of the first embodiment, will be explained with reference to the flowchart of FIG. 11.

In the first embodiment, the actual amount Δ of bowing is gradually decreased from the log as peeling proceeds. When it is determined in step 35 that the backup rolls 21 have reached the imaginary peripheral surface C3, thus eliminating the bowing from the log, the provisional feed rate f of the backup rolls is replaced with the predetermined feed rate F. In this embodiment, however, a log diameter can be freely set where the feeding of the backup rolls 21 at the provisional feed rate f is terminated even before the bowing is eliminated from the log. This log diameter will be referred to as "control-termination diameter φ". If the control-termination diameter φ is detected in step 37, the large spindles are disengaged so that the log is held by the small spindles on the axial ends. Meanwhile, the backup rolls are moved at the predetermined feed rate F from then on rather than the provisional feed rate f (step 41).

In this way, the feed control of the backup rolls at the provisional feed rate f can be stopped upon detection of the control-termination diameter φ. By the time the small spindles are engaged, bowing of the log is eliminated which effectively prevents log damage and avoids suspension of the veneer lathe operation.

Embodiment 3

A third embodiment of the present invention will be explained with reference to FIG. 8. Parts similar to those previously described are denoted by the same reference numerals, so that the description thereof is dispensed with.

In this embodiment, the veneer lathe includes a set of disk rolls 71 movable in an approximately horizontal direction and upper and lower backup rolls 91 and 81, respectively, both movable in oblique directions. The veneer lathe of this embodiment controls the feed of the upper and lower backup rolls 81 and 91 to eliminate the bowing from the log while producing high-quality veneer.

Referring to FIG. 8, the disk rolls 71 constitutes an auxiliary peripheral driving system composed of a plurality of freely rotatable, thin rolls disposed at axially spaced intervals on a common drive shaft 71a. Even without spikes on their peripheral surfaces unlike the above-mentioned peripheral drive rolls 3, the disk rolls 71 can provide additional torque required for smoothly rotating the log 1 from its periphery and prevents the peeled veneer 4 from being stuck at the cutting edge to smoothly transfer the peeled veneer 4 downstream.

The drive shaft 71a is connected to a support frame 73 via a bearing box 71a for receiving additional torque required for smoothly rotating the log 1 from its periphery from a drive motor 72, such as a servomotor, mounted on the support block 11. The support frame 73 is mounted on a slide surface 77 and is freely reciprocated by a disk roll feed mechanism 75. This construction allows the disk rolls 71 to closely follow, and remains in engagement with, the log 1 as its diameter decreases during veneer peeling, supplying part of the torque required for driving the log 1 from its periphery.

The disk roll feed mechanism 75 includes a feed screws 75a, such as a ball screw, connected to the support frame 73 via a bearing box (not shown), a disk roll feed motor 75b, such as a servomotor, a disk roll position detector 75c, such as an rotary encoder. As explained below in detail, the operation of the disk roll feed motor 75b is so controlled by a control unit 101 that the disk rolls 71 closely follow, and remain in engagement with, the log 1 as its diameter decreases during veneer peeling.

The upper backup rolls 81 are a plurality of freely rotatable, sectional backup rolls with numerous spikes 81a thereon. The upper backup rolls 81 are provided on a support frame 83 via a bearing box 81b, and are disposed above the rotational axis of the log 1 approximately diametrically opposite of the disk rolls 71 across the rotational axis of the log 1. The backup rolls 81, engageable with the peripheral surface of the log 1, receive driving force from a drive motor 81c, such as a servomotor, and provide additional torque required for rotating the log 1 from its periphery. The rolls 81 also prevent the log 1 from bowing during peeling. The support frame 83 is mounted on a slide surface 87 and allowed to reciprocate in an oblique direction by an upper backup roll feed mechanism 85.

The upper backup roll feed mechanism 85 includes feed screws 85a, such as ball screws, connected to the support frame 83 via a bearing box (not shown), an upper backup roll feed motor 85b, such as a servomotor, an upper backup roll position detector 85c, such as an rotary encoder. As explained below in detail, the operation of the upper backup roll feed motor 85b is so controlled by the control unit 101 that the upper backup rolls 81 closely follow, and remain in engagement with, the log 1 its diameter decreases during veneer peeling. Also, the upper backup roll feed mechanism 85 can reciprocate the upper backup rolls 81 at a suitable rapid traverse rate.

The lower backup rolls 91 are a plurality of freely rotatable, sectional backup rolls provided on a support frame 93 via a bearing box 91a. The lower backup rolls 91 are located directly under the upper backup rolls 81 below the rotational axis of the log 1. Engageable with the periphery of the log 1, the lower backup rolls 91 receive driving force from a drive motor 91c, such as a servomotor, and supply additional torque required for rotating and peeling the log 1. The rolls 91 also prevent the log 1 from bowing during peeling.

Reference numeral 91d denotes a rotational angle detector, such as a rotary encoder, for measuring rotational angles of the log 1 and sending data representative of the measurements to the control unit 101 to control the feed rate effected by the tool post feed mechanism 18 in accordance with the rotational speed of the log 1. A support frame 93 is mounted on a slide surface 97 and allowed to reciprocate along a predetermined path in an oblique direction by a lower backup roll feed mechanism 95.

The feed mechanism 95 includes a plurality of rotatable lead screws 95a, such as ball threads, a lead screw feeding motor 95b, such as a servomotor, a position detector 95c, such as a rotary encoder. One end of each lead screw 95a is connected to the support frame 93 via a bearing box (not shown). The feeding motor 95b operates under the control of the control unit 101 to control the feed of the lead screws 95a so that the lower backup rolls 91 can stay engaged with the peripheral surface of the log 1 as the diameter of the log 1 decreases in the process of peeling. The feed mechanism 95 can also cause the lower backup rolls 91 to reciprocate at a desired rapid traverse rate.

It should be noted that the rolls 81 may be coated with material, such as rubber or abrasive paper or cloth, instead of the spikes 81a provided thereon. Alternatively, the rolls 81 may be provided with grooves or knurls formed thereon to increase the coefficient of friction when in contact with the log 1. Furthermore, the rolls 81 may have a number of small projections which do not vary the incising depth into the log 1 regardless of the hardness of the log.

Denoted by a reference numeral 101 is a control unit for controlling the overall operation of the above-explained motors in a similar manner to the control units 41 and 61 in the first and second embodiments, respectively. The control unit 101 comprises a controller 101a for performing operations with an installed program on various input signals, such as those received from the detectors. These input signals include a veneer thickness set value T, a correction value α, and a freely designated number of log rotations upon completion of which the bowed portion of the log is to be removed. The control unit 101 further comprises a driving signal transmitter 101b for transmitting output signals from the controller 101a to the motors to control the operation thereof. Also included in the control unit 101 is a compensator 101c for correcting the operation of the controller 101a by calculating the provisional feed rate f from the thickness of veneer T and the correction value α.

Each of the motors may be controlled independently during preparation before or after veneer peeling by means of manual or semiautomatic operation; however, the computer program stored in the control unit 101 controls the operation of all these motors in a conjunctive manner during veneer peeling.

Figure 12:
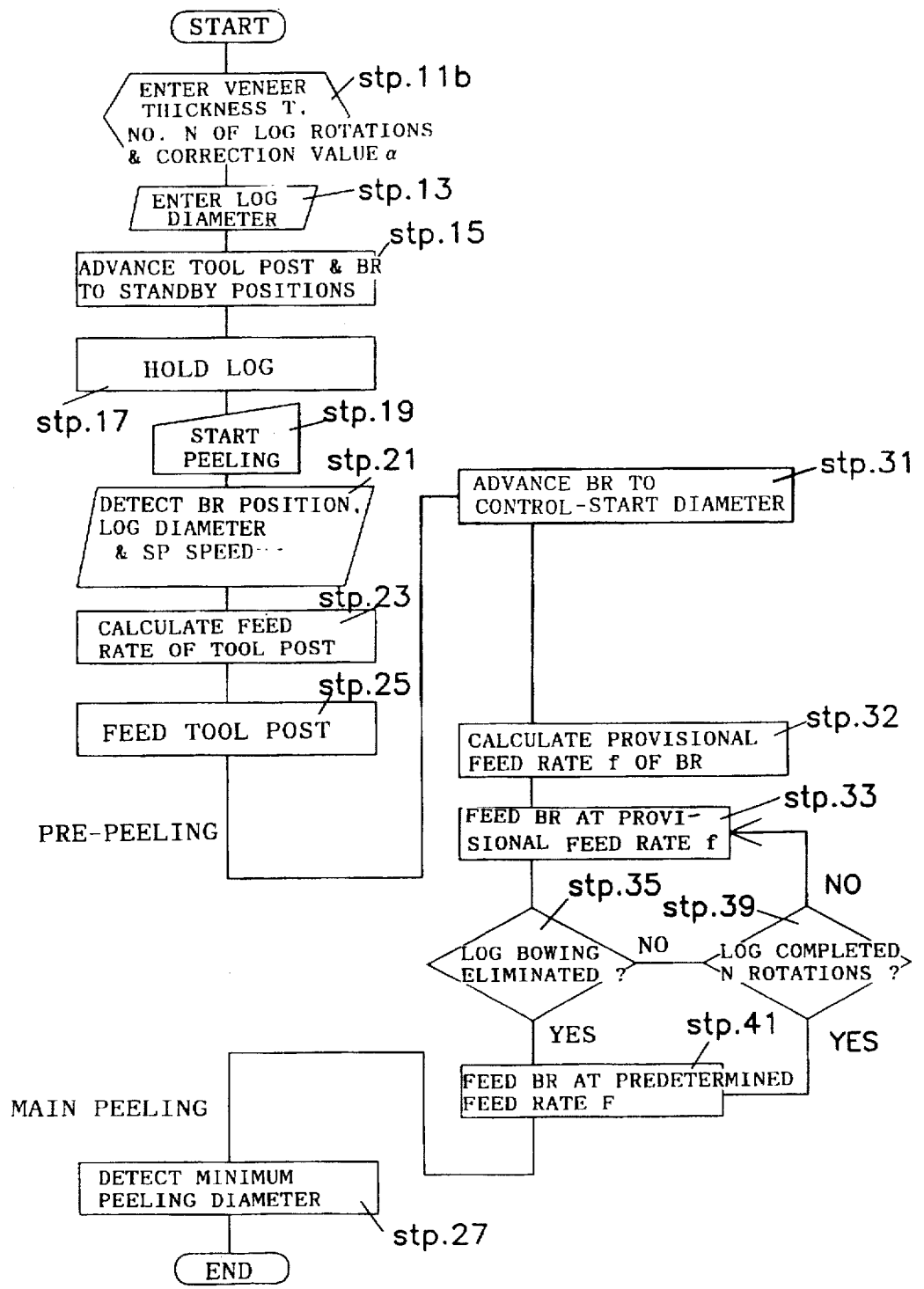
FIG. 12 is a flowchart explaining the method of the third embodiment for controlling the feed of backup rolls.

The method of controlling the feed of the backup rolls of this embodiment will be explained with reference to the flowchart of FIG. 12.

In this embodiment, when it is determined that the bowing has been corrected or eliminated from the log as the peeling proceeds, the provisional feed rate f of the backup rolls is replaced with the predetermined feed rate F as in the first and second embodiments. As a distinguishing feature of this embodiment, when the log 1 has completed a pre-selected number N of rotations since the beginning of the backup roll feeding at the provisional feed rate f (step 39), the provisional feed rate f of the backup rolls is replaced with the predetermined feed rate F (step 41) even if it is not yet determined that the bowing has been eliminated from the log. Main peeling is carried out from this point on until the minimum peeling diameter is reached. In this way, the backup roll feed for eliminating the log bowing can be continued for any desired number of rotations of the log since the beginning of the backup roll feeding at the provisional feed rate f regardless of the diameter of the log being peeled.

In each of the foregoing three embodiments, the bowing of the log is estimated and a correction value $\alpha$ is selected based on the estimated amount $\delta$ of bowing. Then, the provisional feed rate f of the backup rolls is obtained by increasing the predetermined feed rate F by the feed rate of the correction value $\alpha$ per log rotation. The method of the third embodiment is particularly effective when a plurality of logs of similar diameters are peeled consecutively since logs with similar diameters tend to have similar amounts of bowing. Accordingly, the number N of log rotations is set to a large value to peel a group of large-diameter logs consecutively. To peel small-diameter logs one after another, the number N of log rotations is set to a smaller value.

In the fourth and fifth embodiment, on the other hand, the bowing of each log is actually measured, not estimated. Then, the backup rolls are fed based on the actual, measured amount $\Delta$ of bowing. This is particularly effective when there is a wide variation in the diameters of logs to be peeled.

Embodiment 4

Figure 13:
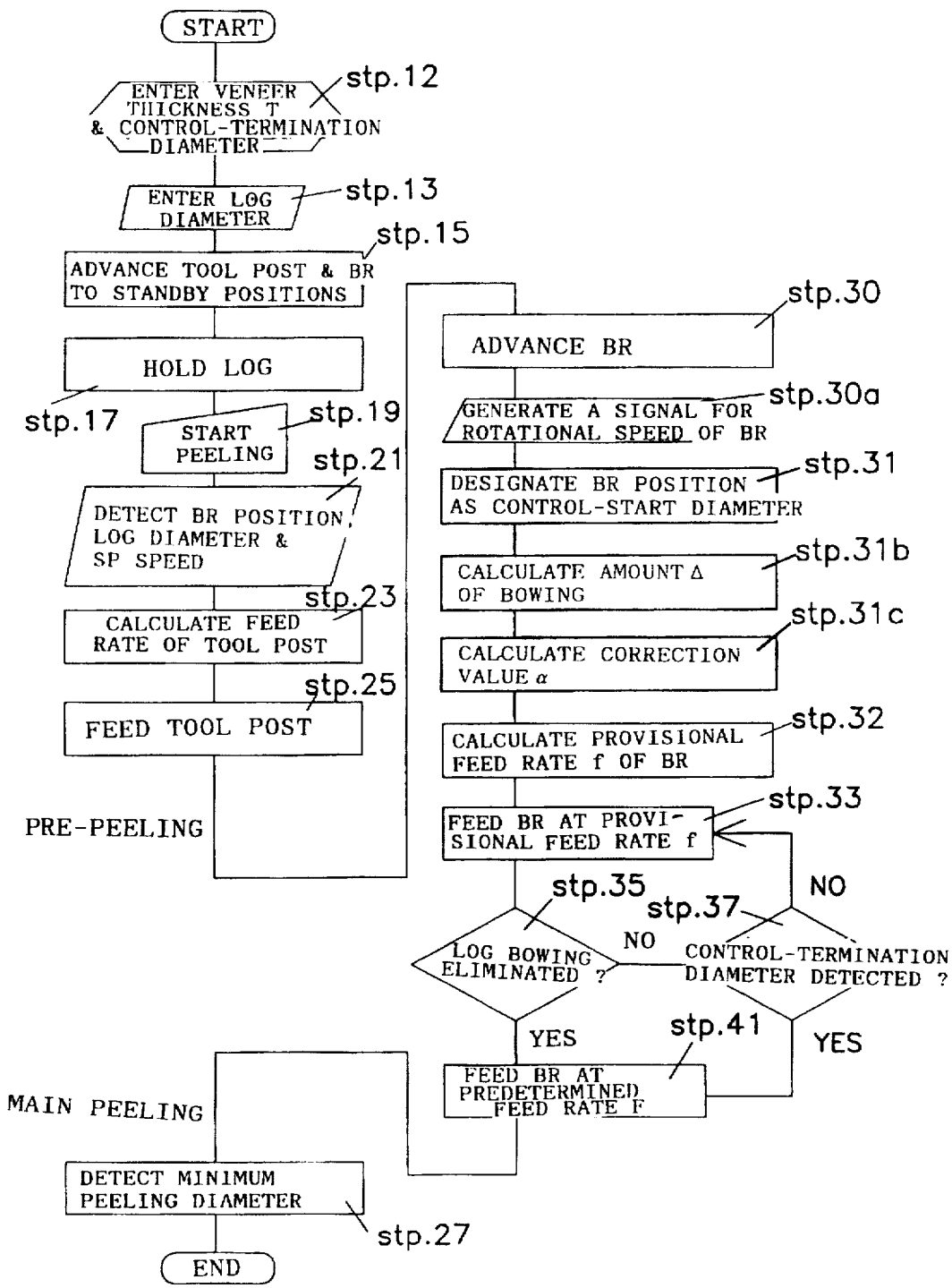
FIG. 13 is a flowchart explaining the method of a fourth embodiment for controlling the feed of backup rolls.

In this embodiment, the backup rolls of the first embodiment are controlled at the feed rate based on the actual, measured amount $\Delta$ of bowing rather than the estimated amount of wrap. Accordingly, the veneer lathe of FIG. 6 of is used for this embodiment. The feed control of the backup rolls of this embodiment is explained with reference to FIG. 13.

In step 12, the veneer thickness T of 2.50 mm is first entered into the controller 41a. The control-termination diameter $\phi$ of 250 mm is also entered into the controller 41a in the same step. As explained before, the control-termination diameter $\phi$ is the value at which the feeding of the backup rolls at the provisional feed rate f is terminated even before the bowing is eliminated from the log. The control-termination diameter $\phi$ is slightly larger than the diameter of the large spindles so that the bowing of the log can be eliminated before the large spindles are removed from the axial ends of the log, thereby leaving only the small spindles holding the log.

The tool post feeding and veneer peeling start when the process reaches step 25. When the operation of the backup rolls 21 is switched to the automatic mode, the backup rolls 21 are transferred from the standby position in the centripetal direction at any suitable speed in step 30. When the backup rolls 21 come into contact with the log 1 to start rotating, the rotational angle detector 21c generates and sends a rotational signal to the control unit 41 in step 30a. Simultaneously with the above generation of the rotational signal of the backup rolls, the position detectors 25c and 18c also generate and send position signals of the backup rolls and tool post, respectively, to the control unit 41 in step 30a. The actual amount $\Delta$ of bowing of the log is calculated from these signals.

Explained below is an example of the determination of the actual amount of bowing and subsequent feed control operation according to this embodiment. In this example, the distance between the reference axis S of the spindles and the point of contact between the backup rolls and the log is 303 mm at the start of the rotation of the backup rolls immediately after the backup rolls touch the log. This means the control-start diameter $\Phi$ is 606 mm. Also, the distance between the reference axis S of the spindles and the cutting edge of the knife 15 carried on the tool post is 300 mm, which corresponds to a log diameter of 600 mm. It should be noted that the position of the edge of the knife is designated as the position of the tool post. The log diameter of 600 mm, which is determined by the position of the tool post, corresponds to the imaginary peripheral surface C at the aforementioned start of the rotation of the backup rolls.

As the position of the backup rolls corresponds to the control-start diameter $\Phi$ of 606 mm (step 31) and the position of the tool post corresponds to the log diameter of 600 mm, the actual amount $\Delta$ of bowing of 3 mm (3 mm=606 mm−600 mm/2) is obtained in step 31b.

To eliminate the actual amount $\Delta$ of bowing from the position of the backup rolls where they first touch the log to the control termination diameter of 250 mm, the correction value a is calculated from the control-start diameter $\Phi$, the control-termination diameter $\phi$, and the veneer thickness T ($\alpha=2\Delta T/(\Phi-\phi)$) in step 31c. Then, the provisional feed rate f is obtained by increasing the predetermined feed rate F by the feed rate of the correction value $\alpha$ per log rotation in step 32. The backup rolls are fed at this provisional feed rate in step 33. That is, the provisional feed rate f is greater than the predetermined feed rate F by the feed rate of the correction value $\alpha$ for each rotation of the log.

The calculation of the correction value $\alpha$ is explained hereinafter using actual values.

Eliminating the actual amount $\Delta$ of bowing of 3 mm from the control-start diameter $\Phi$ to the control-termination diameter $\phi$ means that the bowing is eliminated while the tool post is fed in the centripetal direction by 175 mm (175 mm=(600 mm−250 mm)/2). Also, as the veneer thickness is set to 2.5 mm, the log completes 70 rotations while the tool post is fed 175 mm (175 mm/2.5 mm=70). Therefore, the following expression is established:

Number of log rotations=$(\Phi-\phi)/2T$.

Then, for the actual bowing of 3 mm to be eliminated during the 70 rotations, the backup rolls must be fed approximately additional 0.04 mm per rotation of the log or additional 3 mm/70 for each rotation. The approximate 00.4 mm corresponds to the correction value $\alpha$ and well within a tolerable range in terms of quality. Therefore, the following expression can be established to obtain the correction value $\alpha$.

$\alpha$=$\Delta$/number of log rotation=$2\Delta T/(\Phi-\phi)$

Consequently, the backup rolls need to be advanced at the provisional feed rate f of approximately 2.54 mm (T+$\alpha$) per log rotation.

If the correction value $\alpha$ is outside the tolerable range, the control-termination diameter $\phi$ needs to be changed to less than 250 mm. After the provisional feed rate f is calculated in the aforementioned manner, the backup rolls are fed at the calculated provisional feed rate f in step 33.

The bowing is gradually eliminated from the log as the peeling proceeds. When it is determined in step 35 that the backup rolls 21 have reached the imaginary peripheral surface C, which corresponds to the position of the tool post, so that the bowing has been eliminated, the bowing removal cutting is terminated. Alternatively, if the freely selected control-termination diameter of 250 mm is detected in step 37 even before the bowing is eliminated, the provisional feed rate f of the backup rolls is changed to the predetermined feed rate F in step 41. Concurrently, the large spindles are removed from the log ends so as to continue the peeling with the small spindles. As the small spindles hold the bowing-free log at this point, the bowing can be more effectively eliminated from the log than by conventional methods.

Embodiment 5

Figure 14:
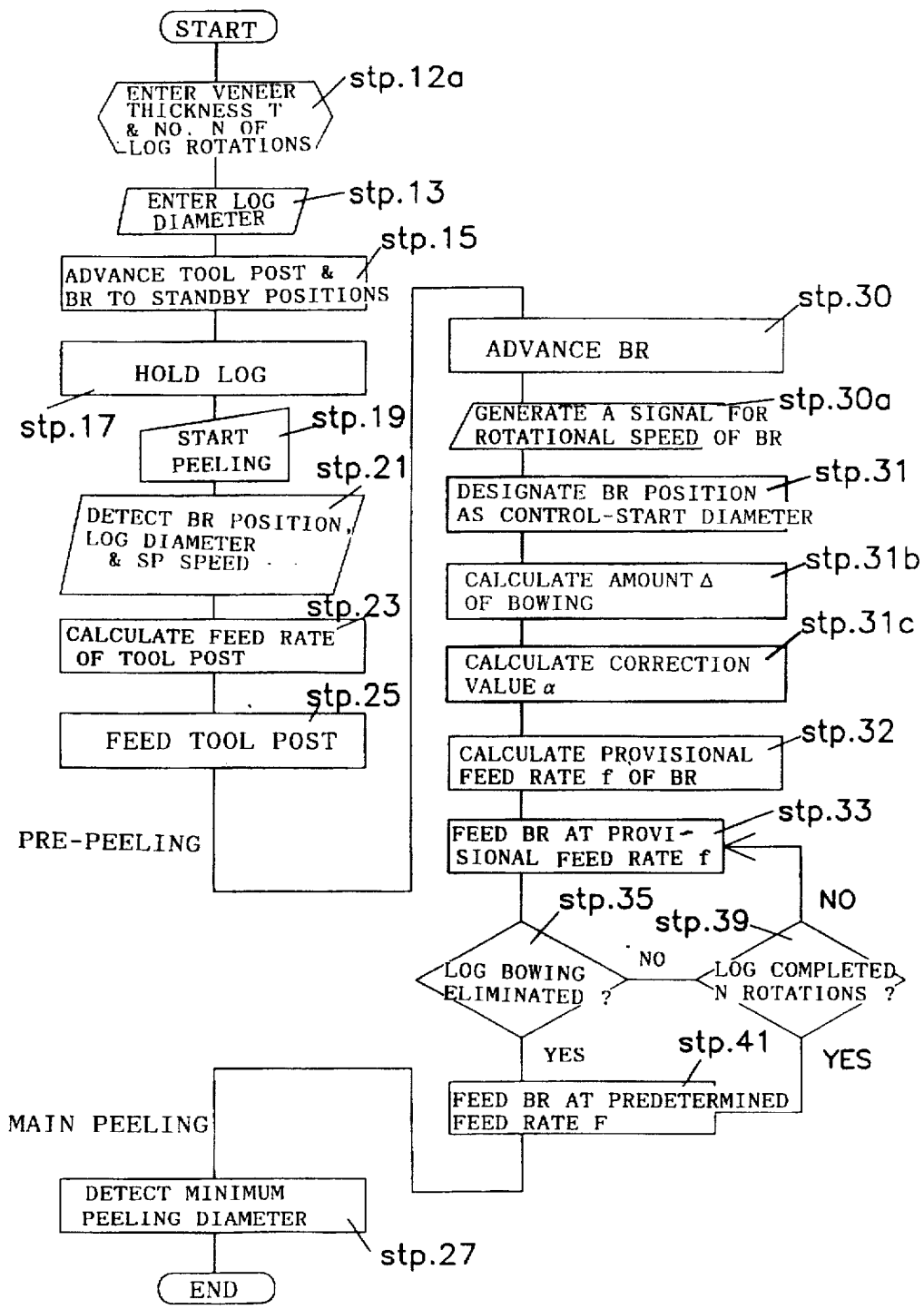
FIG. 14 is a flowchart explaining the method of a fifth embodiment for controlling the feed of backup rolls.
Figure 15:
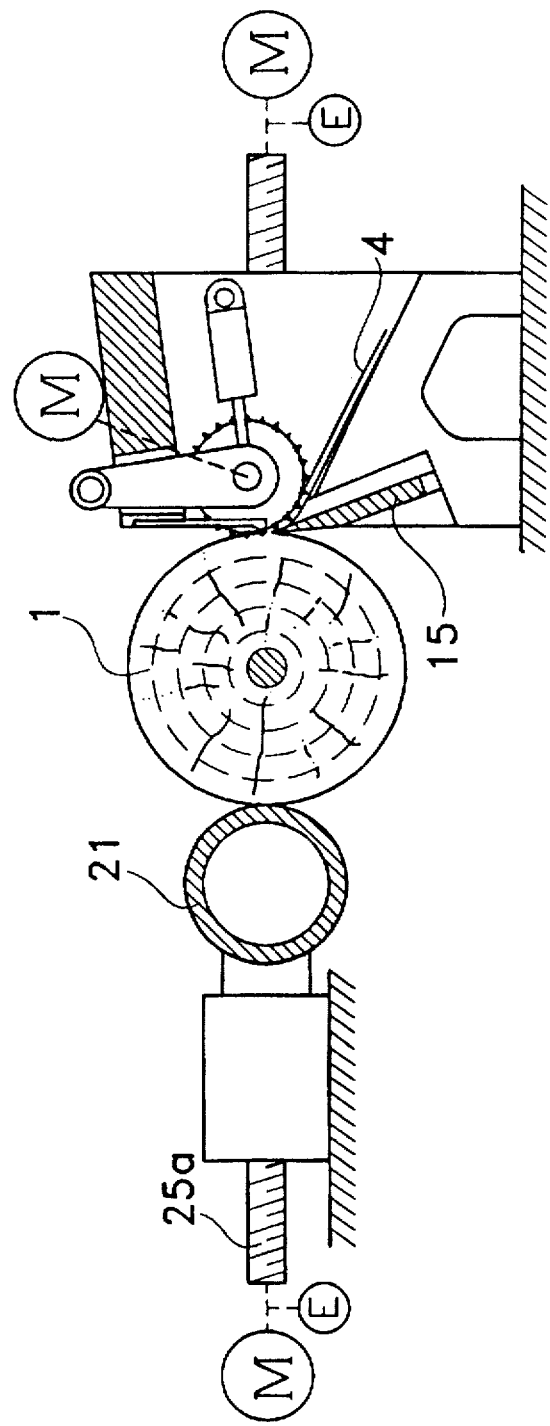
FIG. 15 is a cross sectional side view of a veneer lathe for carrying out a conventional method of controlling the feed of backup rolls.

The feed control method according to the fifth embodiment will be explained with reference to the flowchart of FIG. 14.

Before starting to peel veneer, a veneer thickness of 2.50 mm is entered into the controller 41a in step 12a. Also entered into the controller in this step is the number N of log rotations during which the backup rolls is fed at the provisional feed rate f. That is, the provisional feed rate f of the backup rolls is canceled upon completion of N rotations of the log following the start of the backup roll feeding at the provisional feed rate f. In this embodiment, 30 is entered for the number N.

As in the fourth embodiment, when the process reaches step 25, the tool post starts to be fed to pre-peel veneer from the log. When the feeding of the backup rolls is switched to the automatic operation to perform bowing removal cutting, the backup rolls 21 are transferred in the centripetal direction at any convenient feed rate in step 30. As in the fourth embodiment, when the backup rolls 21 come into contact with the log 1 to start rotating, the rotational angle detector 21c generates and sends a rotational signal to the control unit 41 in step 30a. Simultaneously with the above generation of the rotational signal of the backup rolls, the position detectors 25c and 18c also generate and send position signals of the backup rolls and tool post, respectively, to the control unit 41 in step 30a. The actual amount Δ of bowing of the log is calculated from these signals in step 31b.

As in the fourth embodiment, the position of the backup rolls where they come into contact with the log to start rotation corresponds to the control-start diameter Φ of 606 mm and the position of the tool post at this time corresponds to the log diameter of 600 mm. Then, the actual amount Δ of bowing of 3 mm (3 mm=606 mm−600 mm/2) is obtained in step 31b.

To eliminate this actual amount Δ of bowing between the time backup rolls touch the log and start rotating and the time the log completes N rotations at the control-termination diameter, the correction value α is calculated from the amount Δ of bowing and the number N of the log rotations (α=Δ/N) in step 31c. Then, the provisional feed rate f is obtained by increasing the predetermined feed rate F by the feed rate of the correction value α per log rotation (step 32). The backup rolls are fed at this provisional feed rate in step 33.

The calculation of the correction value α is explained hereinafter using actual values. Eliminating the actual amount Δ of bowing of 3 mm between the time the backup rolls start to rotate at the control-start diameter Φ and the time the log has completed N rotations means that the actual amount Δ of bowing divided by N is the correction value α used to compensate for the predetermined feed rate F, regardless of the diameter of the log being peeled. Then, the correction value α is 0.10 mm (α=3 mm/30) in this case. If this is out of the tolerable range, the number N of rotations needs to be increased. One method is to increase the number of rotations in increments of 10 until the correction value α comes within the tolerable range. For example, if α=0.05 mm, calculated from N=60, is considered acceptable, it is determined that the provisional feed rate of the backup rolls is 2.55 mm per log rotation (veneer thickness T+correction value α=2.55 mm) in step 32.

After the provisional feed rate f is calculated in the aforementioned manner, the backup rolls are advanced at the calculated provisional feed rate f in step 33.

The bowing is gradually eliminated from the log as the peeling proceeds. When it is determined that the bowing has been eliminated in step 35, the bowing removal cutting is terminated. Alternatively, when the log has rotated N times even before it is determined that the bowing has been eliminated (step 39), the provisional feed rate f of the backup rolls is changed to the predetermined feed rate F at step 41 to perform main peeling hereafter.

According to this embodiment, the bowing of a log can be completely eliminated when the log has completed N rotations. Therefore, the method of this embodiment is particularly effective when a plurality of logs of similar diameters are peeled consecutively since logs with similar diameters tend to have similar amounts of bowing. Accordingly, the number N of log rotations is set to a large value to peel large-diameter logs consecutively. To peel a group of small-diameter logs, the number N of log rotations is set to a relatively small value.

Other embodiments

The method of the fourth and fifth embodiments, by which the backup rolls are fed based on the actual amount Δ of bowing, may be applied to the method of the third embodiment.

In the third embodiment, as the backup rolls are rotated before coming into contact with the log, the rotational angle detectors cannot be used to detect the backup rolls coming into contact with the log. To that end, various mechanical amount sensors can be used, including the rotary encoder, strain gauge (load cell, pressure sensor), proximity switch, micro-switch, and displacement sensor. Also, photosensors, such as the catoptric sensor, may be used. Of these examples, the rotary encoder, proximity switch, strain gauge, and catoptric sensor are the preferred in the third embodiment.

For example, a separate rotatable member (not shown) that comes into contact with the log simultaneously with the backup rolls may be provided so that the rotary encoder or proximity switch can detect the signal representing rotation of the rotatable member to indicate that the backup roll has come into contact with the log.

A strain gauge can be used to detect the pressure that the backup rolls receive when coming into contact with the log.

A catoptric sensor can also be employed to detect the surface of the log when the backup rolls come into contact with the log.

It should be noted that these sensors may be employed in the first to fifth embodiments. Effect of the Invention As is apparent from the foregoing description, the present invention can effectively prevent damage to a log during veneer peeling. The bowing can be gradually eliminated from a log so as to produce veneer of high quality with even thickness. Moreover, the present invention allows a log to be peeled to a minimum peeling diameter while preventing the log from bowing, thus enhancing veneer yields.

According to one practice of the invention, the backup rolls are fed from a control-start diameter $\Phi$ at a provisional feed rate f which is higher than a predetermined feed rate F by a feed rate of a pre-selected correction value $\alpha$ per log rotation. (That is, the control-start diameter $\Phi$ is slightly larger than the diameter of the log at which the backup rolls are brought into contact with the log.) By this method, the bowing of the log that occurs during peeling can be gradually reduced by the correction value $\alpha$ for each rotation of the log, so that high-quality veneer with even thickness can be continuously produced.

Unlike conventional methods, this method does not abruptly transfer the backup rolls to the imaginary peripheral surface. Thus, not only is peeled veneer not thicker by the amount of bowing, but also no damage results by abnormal load applied to the log.

According to another practice of the invention, the backup rolls are fed at the provisional feed rate f between the control-start diameter and a pre-selected control-termination diameter $\phi$. This method is particularly effective when applied to a veneer lathe with multiple spindles; if the control-termination diameter $\phi$ is set according to the diameter of one of the spindles, the bowing is eliminated from the log between the control-start diameter and the particular spindle.

If this method is applied to a double-spindle veneer lathe, it is particularly useful to set the control-termination diameter $\phi$ to a value slightly larger than that of the large spindle. The bowed portion can be eliminated by the time the large spindles are removed from the log so as to be replaced by the small spindles. Therefore, as the log grows thinner and thus easier to bow toward the end of the peeling operation, the backup rolls pressure the log on the imaginary peripheral surface C, thereby effectively preventing the log from further bowing.

This method is also applicable to the so-called "spindleless peeling", where spindles are disengaged from the log at a convenient time of peeling operation. If the diameter immediately before the spindles are disengaged is designated as the control-termination diameter $\phi$, the bowed portion can be eliminated by the time the spindles are removed. In this way, when the log is thinner and thus easier to bow toward the end of the peeling operation, the backup rolls pressure the log on the imaginary peripheral surface C, thereby effectively preventing the log from further bowing.

In still another practice, the correction value $\alpha$ is given by the equation: $\alpha=\delta/N$ where $\delta$ is an estimated amount of bowing of the log and N is a pre-selected number of rotations of the log upon completion of which the backup rolls reach a control-termination diameter $\phi$ from the control-start diameter $\Phi$. The backup rolls are fed at the provisional feed rate f until the log completes N rotations, where the backup rolls reach the control-termination diameter $\phi$. This method eliminates the estimated bowing when the log completes N rotations regardless of the diameter of the log to be peeled.

In yet another practice of the invention, the actual amount $\Delta$ of bowing of a log is calculated from the diameter of the log and the position of the backup rolls when the backup rolls are brought into contact with the log. Then, the backup rolls are fed from a control-start diameter $\Phi$ at a provisional feed rate f which is higher than a predetermined feed rate F by a feed rate of a correction value $\alpha$ per log rotation in which the control-start diameter $\phi$ is the diameter of the log when the amount $\Delta$ of bowing of the log is calculated. The correction value $\alpha$ is calculated from the equation: $\alpha=2\Delta T/(\Phi-\phi)$ where T is the thickness of the veneer and $\phi$ is a pre-selected control-termination diameter. The feeding at the provisional rate f is continued until the bowing is eliminated from the log at the latest. The feeding of the backup rolls at the provisional feed rate f is stopped when the control-termination diameter $\phi$ is reached by the time the bowing is eliminated from the log at the latest. Thereafter the backup rolls are fed at the predetermined feed rate F. By this method, the bowing can be gradually eliminated between the control-start diameter and the freely selected control-termination diameter. This method can effectively eliminate the bowing of a log based on the actual amount of bowing. Using the actual amount of bowing is preferable when peeling logs of different types, diameters, lengths and other cutting conditions because bowing varies depending on these factors.

Alternatively, the correction value $\alpha$ may be calculated from the equation: $\alpha=\Delta/N$ where N is a pre-selected number of rotations of the log upon completion of which the backup rolls reach a control-termination diameter $\phi$ from the control-start diameter $\Phi$. In this case, the feeding of the backup rolls at the provisional feed rate f is stopped when the log has completed N rotations, where the backup rolls has reached the control-termination diameter $\phi$. Thereafter the backup rolls are fed at the predetermined feed rate F. In this way, the bowing can be eliminated from the log between the time the backup rolls are on the control-termination diameter $\Phi$ and the time the log completes N rotations regardless of the size of its diameter.

As there may be many other modifications, alterations, and changes without departing from the scope or spirit of the essential characteristics of the present invention, it is to be understood that the above embodiment is only an illustration and not restrictive in any sense. The scope or spirit of the present invention is limited only by the terms of the appended claims.

What is claimed is:

1. A method of controlling the feed of at least one backup roll of a log backup apparatus for use in a veneer lathe, for feeding said at least one backup roll in the centripetal direction of a log and for preventing said log from bowing while veneer is peeled from said log, said method comprising the steps of:

feeding said at least one backup roll from a control-start diameter $\Phi$ at a provisional feed rate f which is higher than a predetermined feed rate F by a feed rate of a pre-selected correction value $\alpha$ per log rotation where said control-start diameter $\Phi$ is slightly larger than the diameter of said log at which said at least one backup roll is brought into contact with said log;

stopping the feeding of said at least one backup roll at said provisional feed rate f by the time the bowing is eliminated from said log at the latest; and thereafter feeding said at least one backup roll at said predetermined feed rate F, whereby the bowing that occurs during the veneer peeling is eliminated from said log during the veneer peeling.

2. The method in accordance with claim 1 wherein the feeding of said at least one backup roll at said provisional feed rate f is stopped when said at least one backup roll has reached a pre-selected control-termination diameter $\phi$ and thereafter said at least one backup roll is fed at said predetermined feed rate F.

3. The method in accordance with claim 1 wherein said correction value $\alpha$ is given by the following equation:

$\alpha=\delta/N$ where δ is an estimated amount of bowing of said log and N is a pre-selected number of rotations of the log upon completion of which said at least one backup roll reaches a pre-selected control-termination diameter φ from said control-start diameter Φ, and further wherein the feeding of said at least one backup roll at said provisional feed rate f is stopped when said at least one backup roll has reached said control-termination diameter φ upon N rotations of said log, and thereafter said at least one backup roll is fed at said predetermined feed rate F.

4. The method in accordance with claim 1 wherein said predetermined feed rate F corresponds to a predetermined thickness of the veneer peeled from said log.

5. The method in accordance with claim 3 wherein said control-start diameter Φ approximately corresponds to the addition of twice said estimated amount δ of bowing of said log to the diameter of said log at the start of the feeding of said at least one backup roll at said provisional feed rate f.

6. The method in accordance with claim 4 wherein said control-start diameter Φ approximately corresponds to the addition of twice said estimated amount δ of bowing of said log to the diameter of said log at the start of the feeding of said at least one backup roll at said provisional feed rate f.

7. A method of controlling the feed of at least one backup roll of a log backup apparatus for use in a veneer lathe, for feeding said at least one backup roll in the centripetal direction of the log and for preventing a log from bowing while veneer is peeled from said log, said method comprising the steps of:

bringing said at least one backup roll into contact with said log;

calculating an amount Δ of bowing of said log from the diameter of said log and the position of said at least one backup roll when said at least one backup roll is brought into contact with said log;

feeding said at least one backup roll from a control-start diameter Φ, until elimination of said bowing at the latest, at a provisional feed rate f which is higher than a predetermined feed rate F by a feed rate of a correction value α per log rotation, said correction value α being calculated from said amount Δ of bowing of said log, where said control-start diameter Φ is the diameter of said log when said amount Δ of bowing of said log is calculated;

stopping said feeding of said at least one backup roll at said provisional feed rate f by the time said bowing is eliminated from said log at the latest; and thereafter feeding said at least one backup roll at said predetermined feed rate F.

8. The method in accordance with claim 7 wherein said correction value α is given by the following equation:

$$\alpha = 2\Delta T/(\Phi - \phi)$$

where T is the thickness of said veneer and φ is a pre-selected control-termination diameter, and further wherein the feeding of said at least one backup roll at said provisional feed rate f is stopped when said at least one backup roll has reached said control-termination diameter φ, and thereafter said at least one backup roll is fed at said predetermined feed rate F.

9. The method in accordance with claim 7 wherein said correction value α is given by the following equation:

$$\alpha = \Delta/N$$

where N is a pre-selected number of rotations of said log upon completion of which said at least one backup roll reaches a control-termination diameter φ from said control-start diameter Φ, and further wherein the feeding of said at least one backup roll at said provisional feed rate f is stopped when said at least one backup roll has reached said control-termination diameter φ upon N rotations of said log, and thereafter said at least one backup roll is fed at said predetermined feed rate F.

10. A log backup apparatus having at least one backup roll for preventing bowing of a log which occurs while veneer is peeled from said log and a control unit for causing said at least one backup roll to be fed in the centripetal direction of said log during veneer peeling, said control unit comprising a compensation controller for controlling the operation of said at least one backup roll so as to:

feed said at least one backup roll from a control-start diameter Φ at a provisional feed rate f which is higher than a predetermined feed rate F by a feed rate of a pre-selected correction value α per log rotation where said control-start diameter Φ is slightly larger than the diameter of said log at which said at least one backup roll is brought into contact with said log;

stop the feeding of said at least one backup roll at said provisional feed rate f by the time the bowing is eliminated from said log at the latest; and thereafter feed said at least one backup roll at said predetermined feed rate F, whereby the bowing that occurs during the veneer peeling is eliminated from said log during the veneer peeling.

11. A log backup apparatus having at least one backup roll for preventing bowing of a log which occurs while veneer is peeled from said log and a control unit for causing said at least one backup roll to be fed in the centripetal direction of said log during veneer peeling, said control unit comprising a compensation controller for controlling the operation of said at least one backup roll so as to:

bring said at least one backup roll into contact with said log;

calculate an amount Δ of bowing of said log from the diameter of said log and the position of said at least one backup roll when said at least one backup roll is brought into contact with said log;

feed said at least one backup roll from a control-start diameter φ, until elimination of said bowing at the latest, at a provisional feed rate f which is higher than a predetermined feed rate F by a feed rate of a correction value α per log rotation, said correction value α being calculated from said amount Δ of bowing of said log, where said control-start diameter Φ is the diameter of said log when said amount Δ of bowing of said log is calculated;

stop said feeding of said at least one backup roll at said provisional feed rate f by the time said bowing is eliminated from said log at the latest; and thereafter feed said at least one backup roll at said predetermined feed rate F.

12. The log backup apparatus in accordance with claim 11 wherein said correction value α is given by the following equation:

$$\alpha = 2\Delta T/(\Phi - \phi)$$

where T is the thickness of said veneer and $\phi$ is a control-termination diameter.

13. The log backup apparatus in accordance with claim 11 wherein said correction value $\alpha$ is given by the following equation:

$$\alpha = \Delta/N$$

where N is a freely selected number of rotations of said log upon completion of which said at least one backup roll reaches a control-termination diameter $\phi$ from said control-start diameter $\Phi$, and further wherein said compensation controller stops the feeding of said at least one backup roll at said provisional feed rate f when said at least one backup roll has reached said control-termination diameter $\phi$ upon N rotations of said log, and thereafter feeds said at least one backup roll at said predetermined feed rate F.

* * * * *